United States Patent
Sato et al.

(10) Patent No.: US 8,848,353 B2
(45) Date of Patent: Sep. 30, 2014

(54) DISPLAY APPARATUS AND ELECTRONIC EQUIPMENT

(75) Inventors: Yutaka Sato, Kawasaki (JP); Tetsukazu Ogura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 334 days.

(21) Appl. No.: 13/471,069

(22) Filed: May 14, 2012

(65) Prior Publication Data

US 2012/0224310 A1    Sep. 6, 2012

Related U.S. Application Data

(63) Continuation of application No. PCT/JP2009/069739, filed on Nov. 20, 2009.

(51) Int. Cl.
*G06F 1/16* (2006.01)
*G06F 1/18* (2006.01)

(52) U.S. Cl.
CPC .............. *G06F 1/187* (2013.01); *G06F 1/1613* (2013.01); *G06F 1/186* (2013.01)
USPC ..................... 361/679.27; 361/679.26; 349/58

(58) Field of Classification Search
CPC ................................................... G06F 1/1616
See application file for complete search history.

(56) References Cited

U.S. PATENT DOCUMENTS

| 6,532,152 | B1 * | 3/2003 | White et al. | 361/692 |
| 6,914,773 | B2 * | 7/2005 | Yang et al. | 361/679.02 |
| 7,006,168 | B2 | 2/2006 | Lee | |
| 7,567,314 | B2 | 7/2009 | Lee | |
| 7,633,747 | B2 * | 12/2009 | Yang et al. | 361/679.3 |
| 8,102,081 | B2 * | 1/2012 | Imamura | 307/132 EA |
| 2003/0048598 | A1 * | 3/2003 | Lee et al. | 361/681 |
| 2004/0041961 | A1 | 3/2004 | Lee | |
| 2006/0050196 | A1 | 3/2006 | Lee | |
| 2006/0181517 | A1 * | 8/2006 | Zadesky et al. | 345/173 |
| 2007/0030636 | A1 * | 2/2007 | Kim | 361/683 |
| 2008/0246741 | A1 * | 10/2008 | Hinata | 345/173 |
| 2009/0009944 | A1 * | 1/2009 | Yukawa et al. | 361/681 |

(Continued)

FOREIGN PATENT DOCUMENTS

| JP | 54-121774 | 9/1979 |
| JP | 11-212487 | 8/1999 |

(Continued)

OTHER PUBLICATIONS

Japanese Office Action issued Apr. 9, 2013 in corresponding Japanese Patent Application No. 2011-541778.
Patent Abstracts of Japan, Publication No. 2008-269393, Published Nov. 6, 2008.

(Continued)

*Primary Examiner* — Anthony Q Edwards
(74) *Attorney, Agent, or Firm* — Staas & Halsey LLP

(57) ABSTRACT

A display apparatus may include a display module having a flat display unit with a front surface and a touchscreen panel extending to cover the front surface by protruding from the display unit. The display unit may have a display screen and projecting pieces projecting parallel to the front surface. The display apparatus may further include a front cover part including an opening to receive the display unit, and a front surface to receive a region of the touchscreen panel protruding from the display unit, and a presser member inserted between the front surface of the front cover part and the projecting pieces in order to minimize floating or lifting of the display module from the front cover part.

14 Claims, 32 Drawing Sheets

(56) References Cited

U.S. PATENT DOCUMENTS

2009/0086420 A1* 4/2009 Stockham et al. ....... 361/679.26
2009/0168384 A1 7/2009 Goto et al.
2009/0171613 A1 7/2009 Tsukazawa

FOREIGN PATENT DOCUMENTS

| | | |
|---|---|---|
| JP | 2004-94256 | 3/2004 |
| JP | 2007-311709 | 11/2007 |
| JP | 2008-269393 | 11/2008 |
| JP | 2008-288518 | 11/2008 |
| JP | 2009-157828 | 7/2009 |
| JP | 2009-163295 | 7/2009 |
| JP | 2009-200291 | 9/2009 |
| WO | WO 2011/061856 A1 | 5/2011 |

OTHER PUBLICATIONS

Espacenet Abstract, Publication No. 2009-200291, Published Sep. 3, 2009.
Espacenet Abstract, Publication No. 2007-311709, Published Nov. 29, 2007.
Espacenet Abstract, Publication No. 2008-288518, Published Nov. 27, 2008.
Espacenet Abstract, Publication No. 54-121774, Published Sep. 21, 1979.
Patent Abstracts of Japan, Publication No. 2004-94256, Published Mar. 25, 2004.
Patent Abstracts of Japan, Publication No. 11-212487, Published Aug. 6, 1999.
International Search Report of Corresponding PCT Application PCT/JP2009/069739 mailed Dec. 22, 2009.

* cited by examiner

DISPLAY APPARATUS AND ELECTRONIC EQUIPMENT

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2009/069739 filed on Nov. 20, 2009, the entire contents of which are incorporated herein by reference.

FIELD

The present invention relates to a display apparatus and an electronic equipment.

BACKGROUND

In portable electronic equipments, such as a lap-top PC (Personal Computer), there are demands to reduce the thickness of the electronic equipment, or to reduce the overall size of the electronic equipment.

Many electronic equipments have a structure in which a circuit board having electronic parts mounted thereon is accommodated within a housing or a casing. When a relatively large electronic part is mounted on the circuit board, the overall thickness of the circuit board, including the electronic part, becomes relatively large. Consequently, the housing that accommodates the circuit board needs to have a thickness that would allow the circuit board to be accommodated therein, and the overall thickness of the electronic equipment increases, contrary to the demands to reduce the thickness of the electronic equipment. In addition, when the relatively large electronic part is mounted on the circuit board, a dead space is likely generated between the housing and portions of the circuit board other than the portion where the electronic part is mounted. The generation of the dead space may also be contrary to the demands to reduce the thickness and the size of the electronic equipment. A SSD (Solid State Drive) is an example of such an electronic equipment that becomes relatively large. The SSD is a storage device having a large storage capacity, and may replace a HDD (Hard Disk Drive) conventionally implemented in the lap-top PC or the like.

The problem described above may occur when the relatively large electronic part, such as the SSD, is mounted on the circuit board. Hence, it may be conceivable to accommodate the relatively large electronic part within the housing, separately from the circuit board, by accommodating the relatively large electronic part in a region within the housing other than the region in which the circuit board is provided, along an in-plane direction of the circuit board. In this conceivable case, it may be possible to avoid the overall thickness of the housing from becoming a sum of the thickness of the circuit board and the thickness of the electronic part. However, the electronic part must be stably held in the housing, separately from the circuit board. When the electronic part is fixed directly on the housing by screws, the electronic part is easily affected by external forces applied on the housing. On the other hand, when the electronic part is fixed on the housing via a shock absorbing material, the number of parts increases to thereby increase the cost of the electronic equipment as a whole.

For example, a FPC (Flexible Printed Circuit) has been proposed which may be bent or folded. In addition, an arrangement has been proposed in which a liquid crystal panel and a battery are arranged side by side on a plane, in order to reduce the thickness of a wrist watch, for example.

SUMMARY

Accordingly, it is an object in one aspect of the embodiment to provide a display apparatus and an electronic equipment, that may stably hold an electronic part separately from a circuit board.

According to one aspect of the present invention, a display apparatus may include a display module having a flat display unit with a front surface, and a touchscreen panel provided on the display unit and extending to cover the front surface by protruding from the display unit, the display unit having a display screen on the front surface thereof and projecting pieces projecting parallel to the front surface from a side surface of the display unit at a position separated from the front surface towards a rear surface of the display unit; a front cover part including an opening to receive the display unit, and a front surface to receive a region of the touchscreen panel protruding from the display unit; and a presser member inserted between the front surface of the front cover part and the projecting pieces in order to minimize floating or lifting of the display module from the front cover part.

According to another aspect of the present invention, an electronic equipment includes a display apparatus including a display module having a flat display unit with a front surface, and a touchscreen panel provided on the display unit and extending to cover the front surface by protruding from the display unit, said display unit having a display screen on the front surface thereof and projecting pieces projecting parallel to the front surface from a side surface of the display unit at a position separated from the front surface towards a rear surface of the display unit; a front cover part including an opening to receive the display unit, and a front surface to receive a protruding region of the touchscreen panel protruding from the display unit; and a presser member inserted between the front surface of the front cover part and the projecting pieces in order to minimize floating or lifting of the display module from the front cover part; and a main unit having a keyboard and a hinge, and accommodating a circuit board mounted with electronic parts having a computing function, wherein the main unit is connected to the display apparatus via the hinge, and includes a closed state in which the display apparatus overlaps the keyboard with the front surface of the front cover part facing the keyboard, and an open state in which the front surface of the front cover part faces a front of the electronic equipment or faces obliquely upwards towards the front of the electronic equipment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

According to one aspect of one embodiment, an electronic equipment may include a housing, a circuit boar, a first electronic part, a cable part, and a second electronic part. The circuit board may include a first connector and be accommodated within the housing. The first electronic part may include a second connector. The first electronic part may be accommodated in a region of the housing, outside a region of the housing in which the circuit board is accommodated, along an in-plane direction of the circuit board, with a rear of the second connector arranged to face the circuit board.

The cable part may connect the first connector and the second connector via a path overlapping the first electronic part. The second electronic part may be arranged at a position overlapping the first electronic part via the cable part, in a state pressing against the cable part.

According to this electronic equipment, the first electronic part is pressed by the second electronic part via the cable, and is stably held in this position.

A description will now be given of the display apparatus and the electronic equipment in each embodiment according to the present invention.

In each embodiment, a lap-top PC is described as an example of the electronic equipment, however, the electronic equipment disclosed herein is not limited to the lap-top PC.

Figure 1:
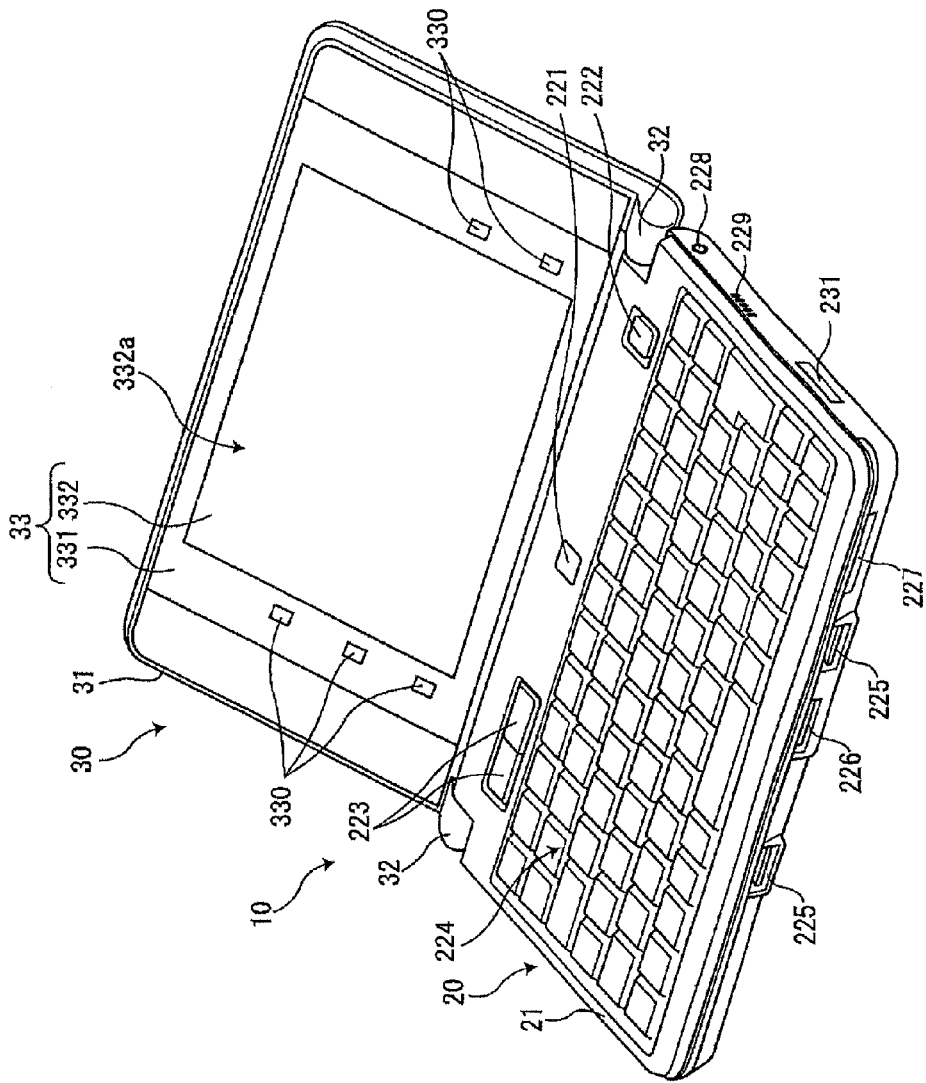
FIG. 1 is a perspective view illustrating an external appearance of a lap-top PC viewed obliquely from a front right direction, in a state in which a lid is open.
Figure 2:
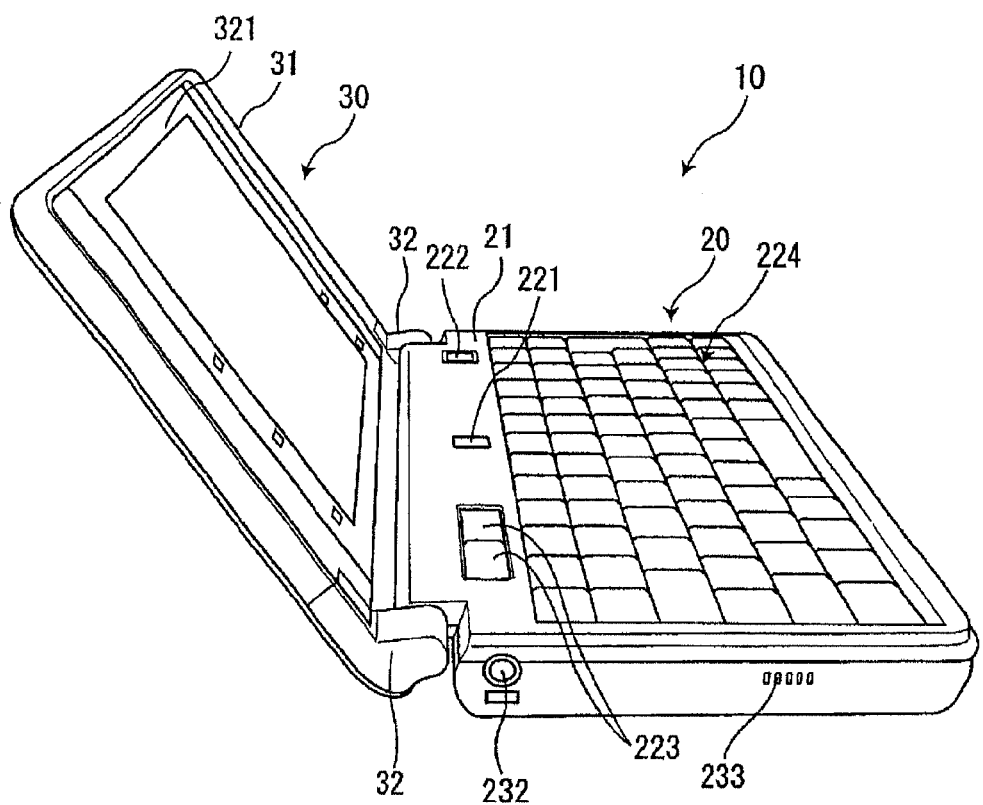
FIG. 2 is a perspective view illustrating the external appearance of the lap-top PC viewed obliquely from a front left direction, in the state in which the lid is open.

FIG. 1 is a perspective view illustrating an external appearance of the lap-top PC viewed obliquely from a front right direction, in a state in which a lid is open. FIG. 2 is a perspective view illustrating the external appearance of the lap-top PC viewed obliquely from a front left direction, in the state in which the lid is open. In addition, FIG. 3 is a perspective view illustrating the external appearance of the lap-top PC illustrated in FIGS. 1 and 2 viewed obliquely from a rear bottom direction, in the state in which the lid is open.

Figure 3:
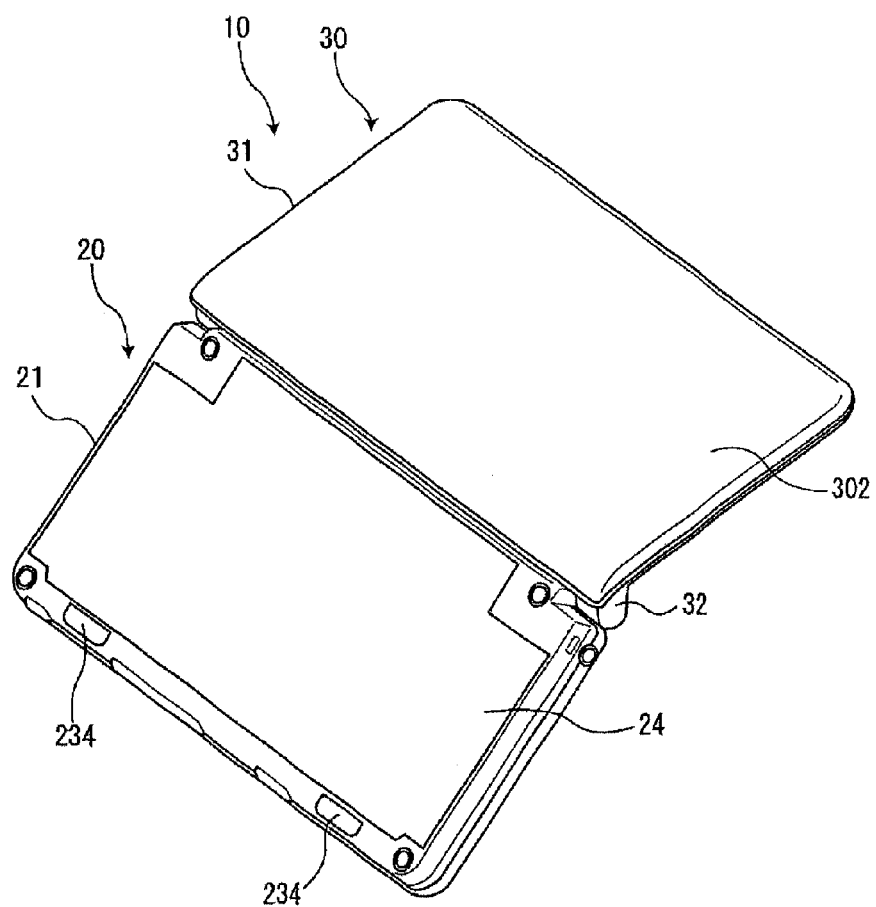
FIG. 3 is a perspective view illustrating the external appearance of the lap-top PC illustrated in FIGS. 1 and 2 viewed obliquely from a rear bottom direction, in the state in which the lid is open.

A lap-top PC 10 illustrated in FIGS. 1 through 3 includes a main unit (or main body) 20 and a display apparatus 30. The display apparatus 30 may form the lid that is rotatably (or pivotally) mounted on the main unit 20 via a hinge part which will be described later. The display apparatus (lid) 30 may freely open from a closed state to an open state, and may freely close from the open state to the closed state. In FIGS. 1 through 3, a hinge cap 32 covers the hinge part which will be described later.

The main unit 20 includes a main housing (or casing) 21. A top surface of the main housing 21 includes a power button 221, a cursor manipulator (or cursor moving part) 222, a pair of buttons 223, and a keyboard 224. The cursor manipulator 222 may be manipulated by a user in order to move a cursor on a display screen that is provided on a front surface of a LCD unit which will be described later and is assembled in the display apparatus 30. The pair of buttons 223 may correspond to right and left click buttons of a mouse (not illustrated), that is a typical example of a pointing device.

As illustrated in FIG. 1, a front end surface of the main housing 21 includes two USB (Universal Serial Bus) connectors 225, a connector (jack or opening) 226 for receiving a LAN/CRT (Local Area Network/Cathode Ray Tube) conversion cable plugged therein, and a memory card slot 227.

As illustrated in FIG. 1, a right side surface of the main housing 21 includes a D.C. power jack (or opening) 228, an air intake (or opening) 229, and a wireless LAN ON/OFF switch 231.

In addition, as illustrated in FIG. 2, a left side surface of the main housing 21 includes an audio jack (or opening) 232, and an air intake (or opening) 233.

Furthermore, as illustrated in FIG. 3, a bottom surface of the main housing 21 includes a battery pack 24. The battery pack 24 forms the bottom surface of the main unit 20, together with the main housing 21.

The battery pack 24 may be removed from the main housing 21 by sliding a slide lever 234 horizontally.

Moreover, as illustrated in FIG. 3, a rear surface of the display apparatus 30 is covered by a rear cover part 302 that forms a display housing (or casing) 31 of the display apparatus 30.

Figure 4:
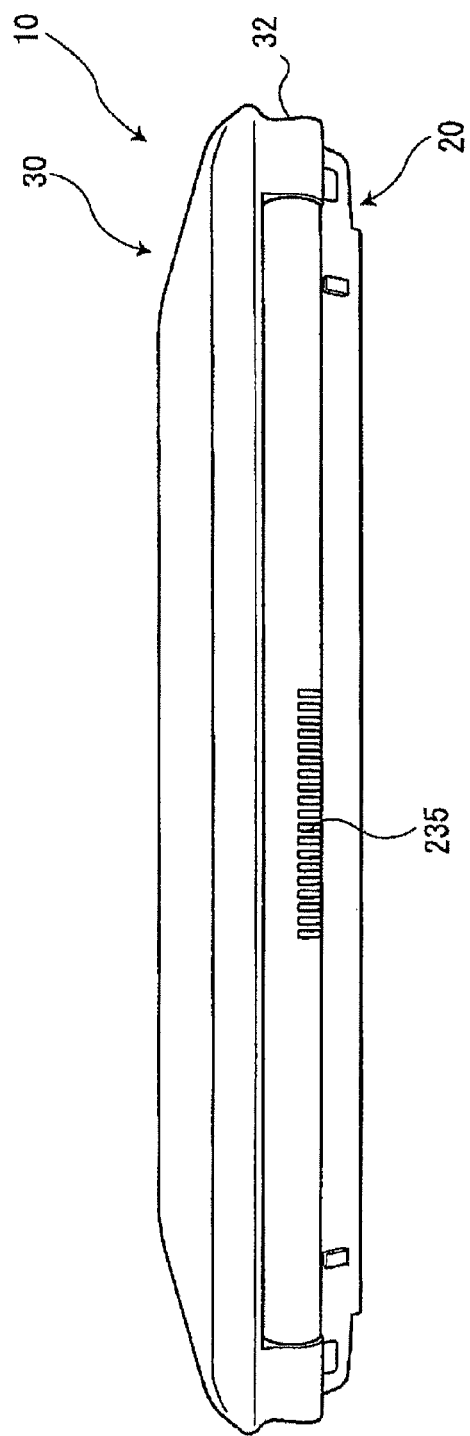
FIG. 4 is a rear view illustrating an end surface on a rear side (hinge side) of the lap-top PC illustrated in FIGS. 1 through 3, in a state in which the lid is closed.
Figure 5:
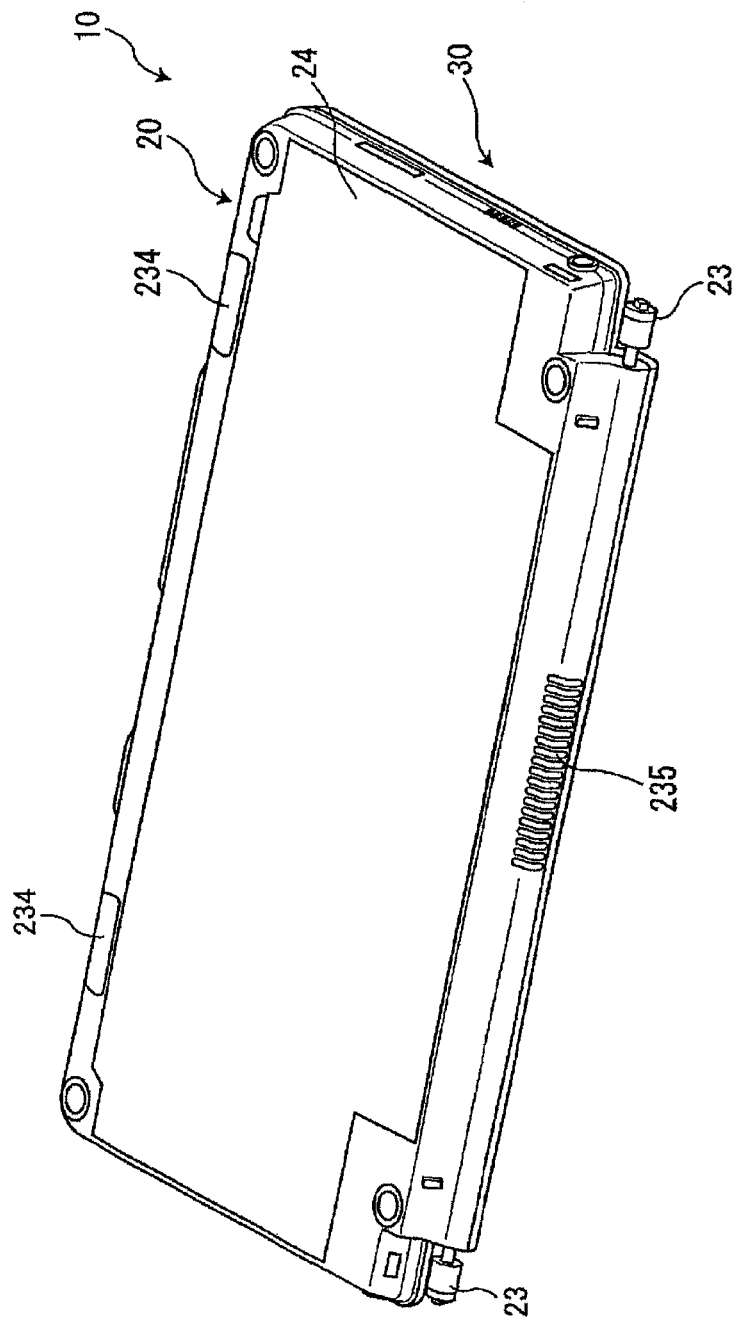
FIG. 5 is a perspective view illustrating a bottom surface of a main unit of the lap-top PC illustrated in FIGS. 1 through 4 viewed obliquely from the rear side (hinge side), in the state in which the lid is closed.

FIG. 4 is a rear view illustrating an end surface on a rear side (hinge side) of the lap-top PC illustrated in FIGS. 1 through 3, in a state in which the lid is closed. In addition, FIG. 5 is a perspective view illustrating a bottom surface of a main unit of the lap-top PC illustrated in FIGS. 1 through 4 viewed obliquely from the rear side (hinge side), in the state in which the lid is closed.

A rear end surface of the main housing 21 includes, at an upper central part thereof, an air outlet 235. A air cooling fan (to be described later) is provided inside the main housing 21. When this fan is rotated, air is sucked into the main housing 21 via the air intake 229 at the right side surface of the main housing 21 and via the air intake 233 at the left side surface of the main housing 21, and exhausted via the air outlet 235. Virtually all of the air that is exhausted is exhausted via the air outlet 235, however, the air enters the main housing 21 not only via the two air intakes 229 and 233 provided in the right and left side surfaces of the main housing 21, but also via various other openings such as the connector (jack or opening) for receiving and connecting to a connector.

As illustrated in FIG. 1, a touchscreen panel 331 is provided on a front surface of the display housing 31 of the display apparatus 30. A LCD (Liquid Crystal Display) unit 332 is arranged on a rear surface of the touchscreen panel 331, at a central part excluding a peripheral edge part of the touchscreen panel 331. The LCD unit 332 includes a display screen 332a for displaying an image, provided on a front surface thereof. The image displayed on the display screen 332a may be visually confirmed from the front surface of the LCD unit 332 through the touchscreen panel 331. The touchscreen panel 331 and the LCD unit 332 form a display module 33, which is a composite part integrally including the two units 331 and 332. Right and left parts of the touchscreen panel 331, outside the LCD unit 332, may be used to provide touchscreen type buttons 330, such as a scroll button, a power save button, and the like.

Figure 6:
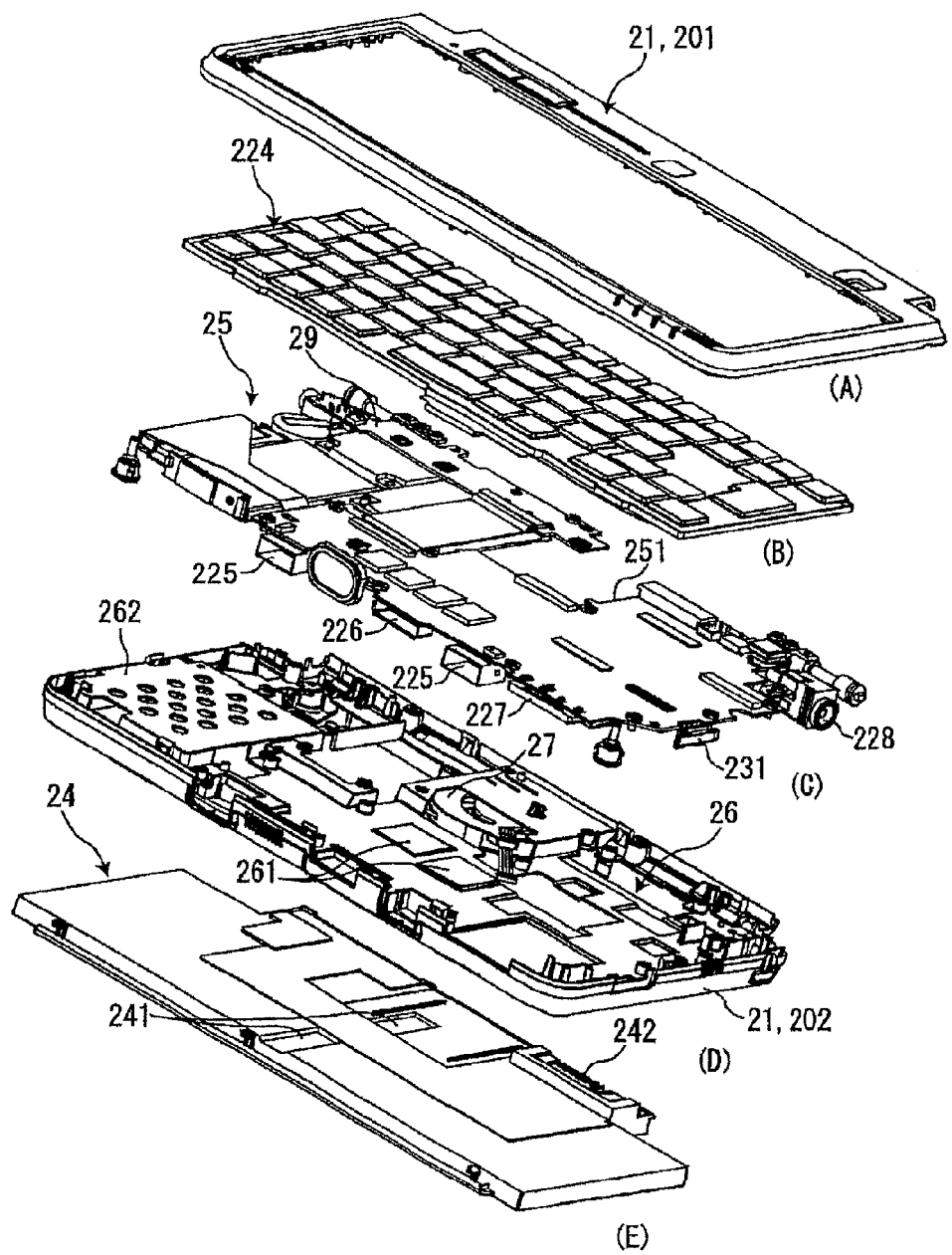
FIG. 6 is a disassembled perspective view illustrating the main unit of the lap-top PC illustrated in FIGS. 1 through 5.

FIG. 6 is a disassembled perspective view illustrating the main unit of the lap-top PC illustrated in FIGS. 1 through 5.

The main unit 20 includes a circuit board 25 inside, as illustrated in FIG. 6(C). The main unit 20 has a plate shape extending parallel to a part mounting surface of the circuit board 25. The main housing 21 is formed by a top cover part 201 as illustrated in FIG. 6(A), and the keyboard 224 is provided as illustrated in FIG. 6(B). The circuit board 25 mounted with various electronic parts is provided under the keyboard 224 as illustrated in FIG. 6(C). The electronic parts may have a computing function.

FIG. 6(C) illustrates, in addition to the circuit board 25, a sub circuit board 29 with respect to a main circuit board formed by the circuit board 25, and various parts, that are assembled. The circuit board 25 includes a cutout 251 to avoid interfering with a fan 27 illustrated in FIG. 6(D). The circuit board 25 is mounted with the two USE connectors 225, the connector 226 for receiving the LAN/CRT conversion cable plugged therein, the memory card slot 227, the D.C. power jack 228, and the wireless LAN ON/OFF switch 231. A plurality of various other parts are also mounted on the circuit board 25. The circuit board 25 is also mounted with two heat generating electronic parts, such as CPU (Central Processing Unit) LSIs (Large Scale Integrated circuits), on a back surface with respect to the surface illustrated in FIG. 6. The heat generating electronic parts will be described later.

FIG. 6(D) illustrates a bottom cover 202 forming the main housing 21, and a chassis 26 in a state accommodated in the bottom cover 202.

The chassis 26 is made of a metal having a sufficiently high thermal conductivity, and functions as both a support for the circuit board 25 and a heat sink for the circuit board 25.

The chassis 26 is mounted with the fan 27. The fan 27 air-cools the inside of the main housing 21, and is located immediately on the inner side of the air outlet 235 illustrated in FIGS. 4 and 5 and provided in the main housing 21 (bottom cover 202). The fan 27 sucks the air from both the upper and lower parts thereof and exhausts the air via the air outlet 235 in the rear end surface of the main housing 21.

Two heat sink surfaces 261 are located on the chassis 26 adjacent to the fan 27. The two heat sink surfaces 261 make contact with two heat generating electronic parts mounted on the surface of the circuit board 25 opposite to the surface illustrated in FIG. 6, and transfer the heat from the heat generating electronic parts to the chassis 26. A SSD (Solid State Drive) receiving part 262 that projects towards the top cover part 201 and has a recess on a back surface thereof is provided on the chassis 26. The recess on the back surface of the SSD receiving part 262, on the same side as the battery pack 24, accommodates a SSD. The chassis 26 includes other structures, however, a description thereof will be omitted, and a description will be given later if necessary.

FIG. 6(E) illustrates the battery pack 24. The battery pack 24 faces the inside of the main housing 21 so that a first surface illustrated in FIG. 6(E) opposes the chassis 26. A second surface of the battery pack 24, opposite to the first surface, is exposed to the outside and forms the bottom surface of the main unit 20 together with the bottom cover 202, as illustrated in FIGS. 3 and 5.

The first surface of the battery pack 24 illustrated in FIG. 6(E) includes a recess 241 extending in a depth direction of the main unit 20. In this example, a central part of the recess 241 extending in the depth direction is partitioned for a reason which will be described later. The first surface of the battery pack 24 includes a connector 242 to charge and discharge battery cells (not illustrated in FIG. 6) within the battery pack 24.

Figure 7:
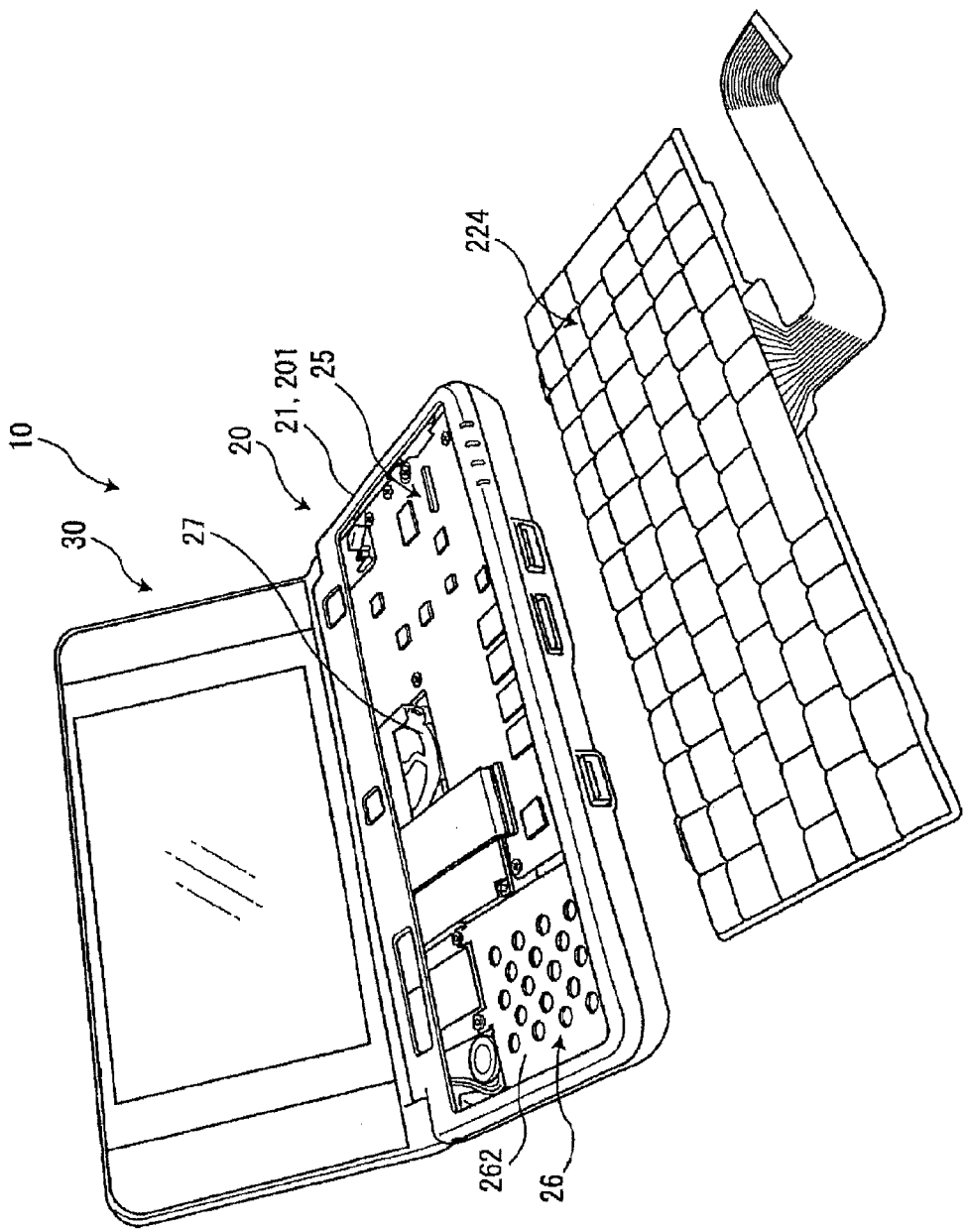
FIG. 7 is a perspective view illustrating the lap-top PC in a state in which the lid is open and a keyboard is removed.

FIG. 7 is a perspective view illustrating the lap-top PC in a state in which the lid is open and the keyboard is removed. In addition, FIG. 8 is a perspective view illustrating the lap-top PC in a state in which the lid is open and the top cover part and the keyboard are removed.

The circuit board 25 extends within the main housing 21, and the fan 27 mounted on the chassis 26 is arranged within the cutout 251 of the circuit board 25.

Figure 9:
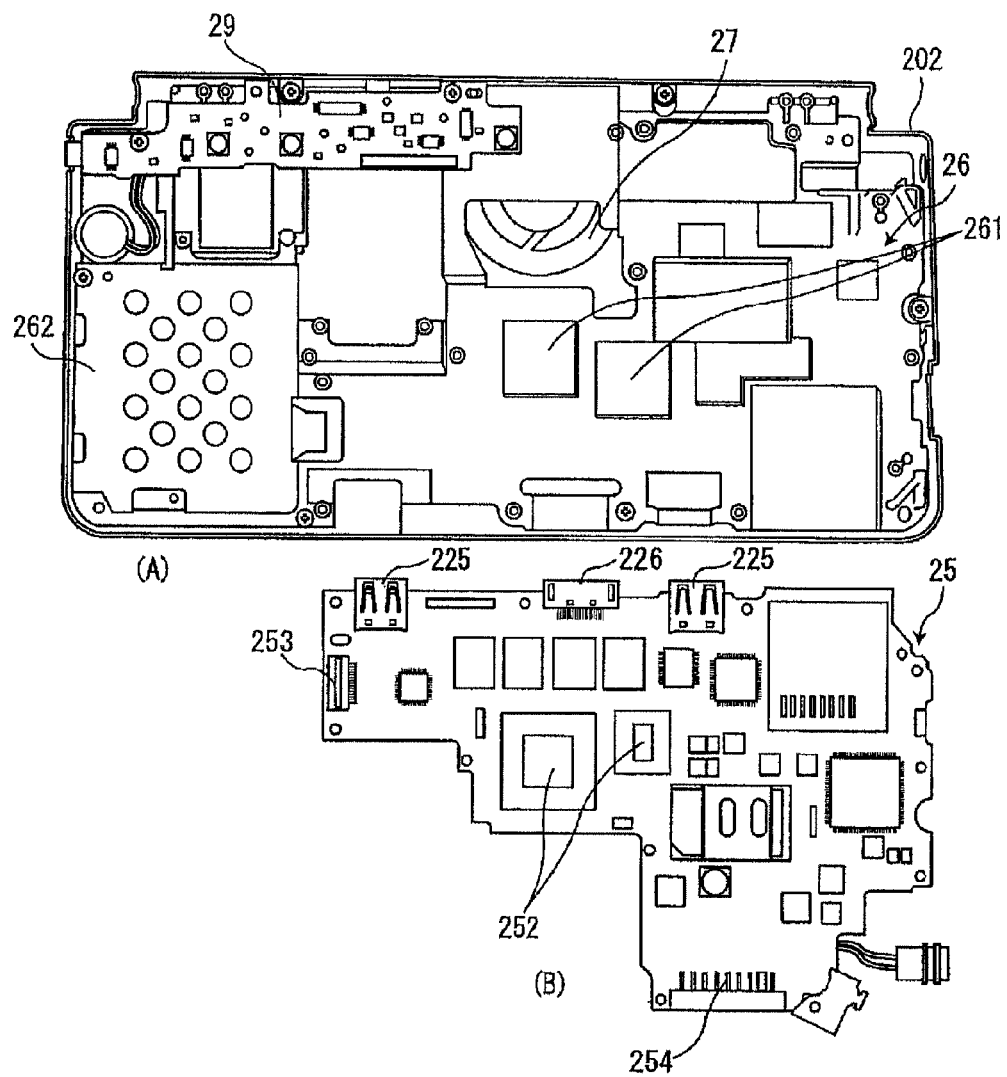
FIG. 9 is a diagram illustrating a state in which a circuit board is further removed from the main unit of the lap-top PC.

FIG. 9 is a diagram illustrating a state in which the circuit board is further removed from the main unit of the lap-top PC. In FIG. 9, the sub circuit board 29 is provided on the chassis 26, and the entire display apparatus 30 is removed from the main unit 20.

Figure 8:
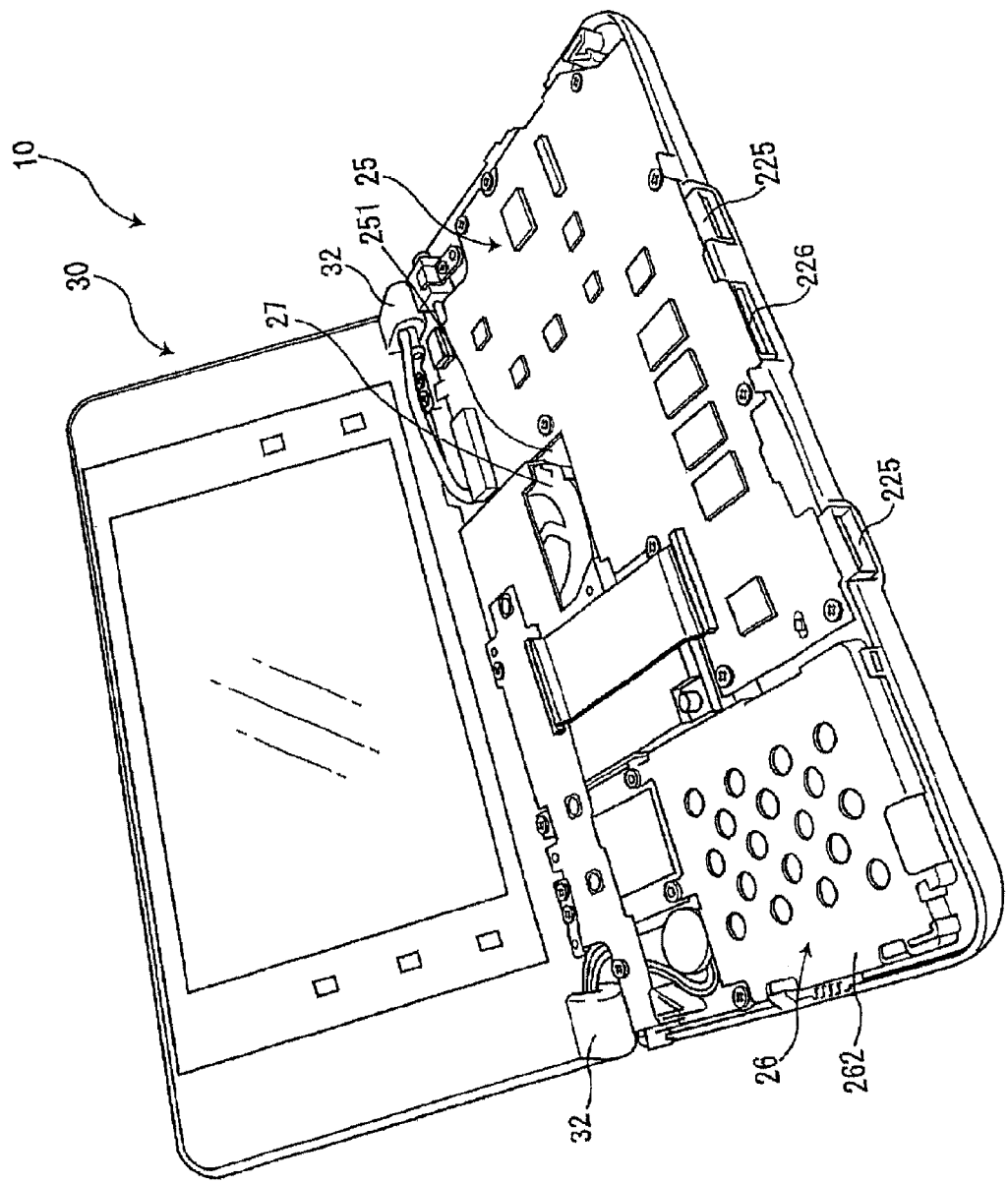
FIG. 8 is a perspective view illustrating the lap-top PC in a state in which the lid is open and a top cover part and the keyboard are removed.

FIG. 9(B) illustrates the back surface of the circuit board 25 with respect to the board surface illustrated in FIGS. 6 through 8. Two heat generating electronic parts 252 are mounted on the back surface of the circuit board 25. The two heat generating electronic parts 252 make contact with the two heat sink surfaces 261 of the chassis 26 illustrated in FIG. 9(A), and the heat generated from the heat generating electronic parts 252 is transferred to the chassis 26 via the heat sink surfaces 261. In addition, the back surface of the circuit board 25 illustrated in FIG. 9(B) is mounted with a connector 253 to connect to the SSD which will be described later, and a connector 254 to connect to the connector 242 of the battery pack 24 illustrated in FIG. 6(E).

Figure 10:
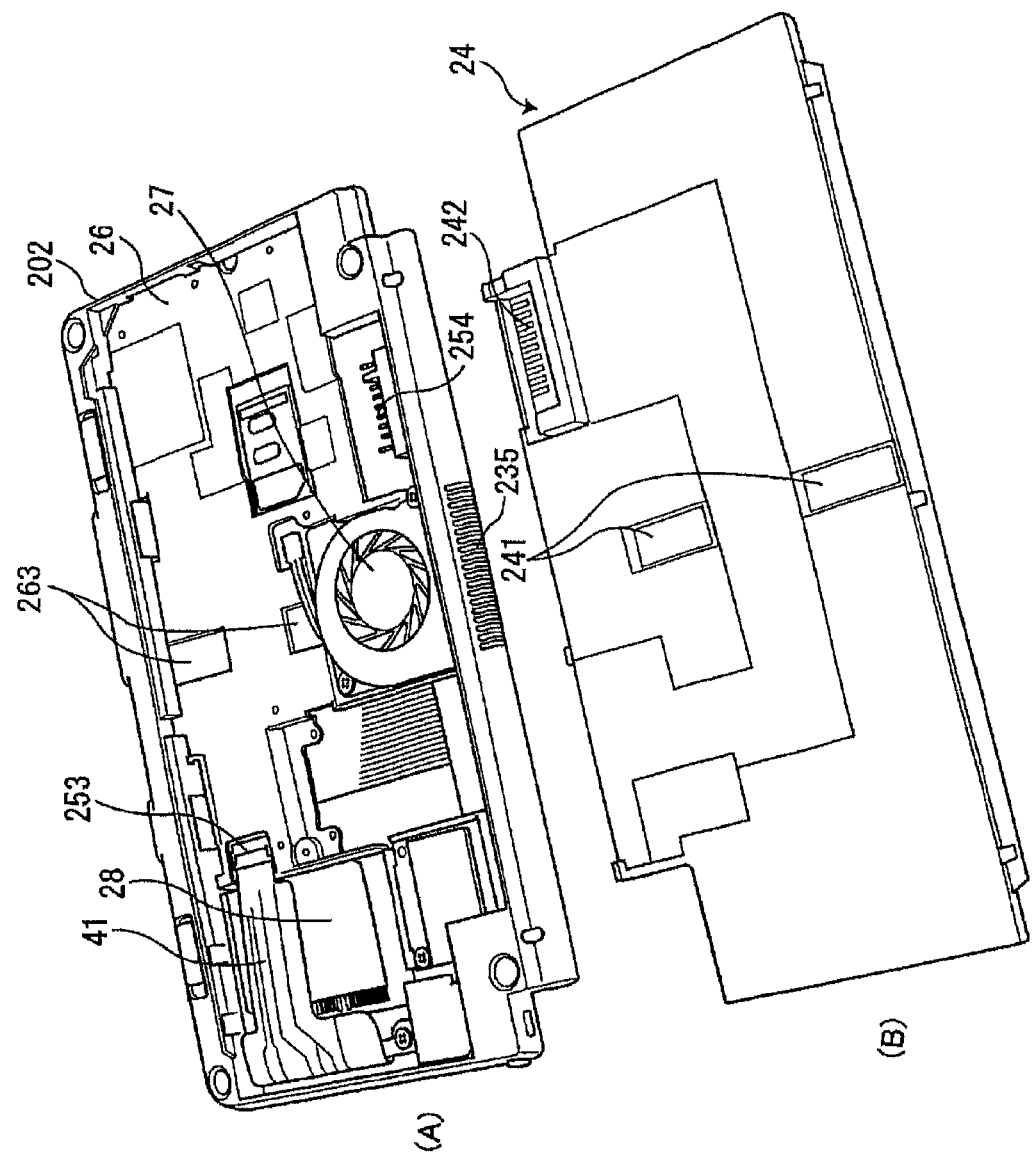
FIG. 10 is a diagram illustrating a state in which a battery pack is removed from the bottom surface of the main unit of the lap-top PC.

FIG. 10 is a diagram illustrating a state in which the battery pack is removed from the bottom surface of the main unit of the lap-top PC. The entire display apparatus 30 is removed from the main unit 20.

As illustrated in FIG. 10(A), the bottom cover 202 forming the main housing 21 of the main unit 20 has a frame shape having a central part that is open. The battery pack 24 illustrated in FIG. 10(B) fits into the opening of the frame shape formed by the bottom cover 202, and the battery pack 24 forms the bottom surface of the main unit 20 together with the bottom cover 202.

As illustrated in FIG. 10(A), the chassis 26 extends within the bottom cover 202, and the fan 27 is fixed on the chassis 26. In addition, a SSD 28 is accommodated in the SSD receiving part 262 of the chassis 26, illustrated in FIGS. 6 through 8. A connector of the SSD 28, which will be described later, is connected to the connector 253 provided on the circuit board 25, illustrated in FIG. 9, via a FPC (Flexible Printed Circuit) 41.

Further, as illustrated in FIG. 10(A), the air outlet 235 is provided in the rear end surface of the bottom cover 202 forming the main housing 21. The fan 27 is arranged immediately on the inner side of the air outlet 235. A groove 263 is formed in the chassis 26, and extends from the front surface side of the main unit 20 towards the fan 27 in the depth direction. The groove 263 facilitates the air flow towards the fan 27 within the main housing 21.

FIG. 10(B) illustrates the first surface of the battery pack 24 facing the inner side of the main housing 21. As described above, the first surface of the battery pack 24 includes the recess 241 located in the central part relative to the right and left sides of the battery pack, and extending in the depth direction of the main unit 20. Positions of the recess 241 and the groove 263 formed in the chassis 26 are aligned, and a part of the recess 241 extends to a position overlapping the fan 27. The recess 241 also facilitates the air flow towards the fan 27 within the main housing 21. The battery pack 24 is mounted on the bottom cover 202 in order to assume a state in which the battery pack 24 is slightly floating or lifted from the chassis 26. In this state, the connector 242 of the battery pack 24 connects to the connector 254 on the circuit board 25 illustrated in FIG. 9(B).

[SSD Connecting FPC Mechanism]

Figure 11:
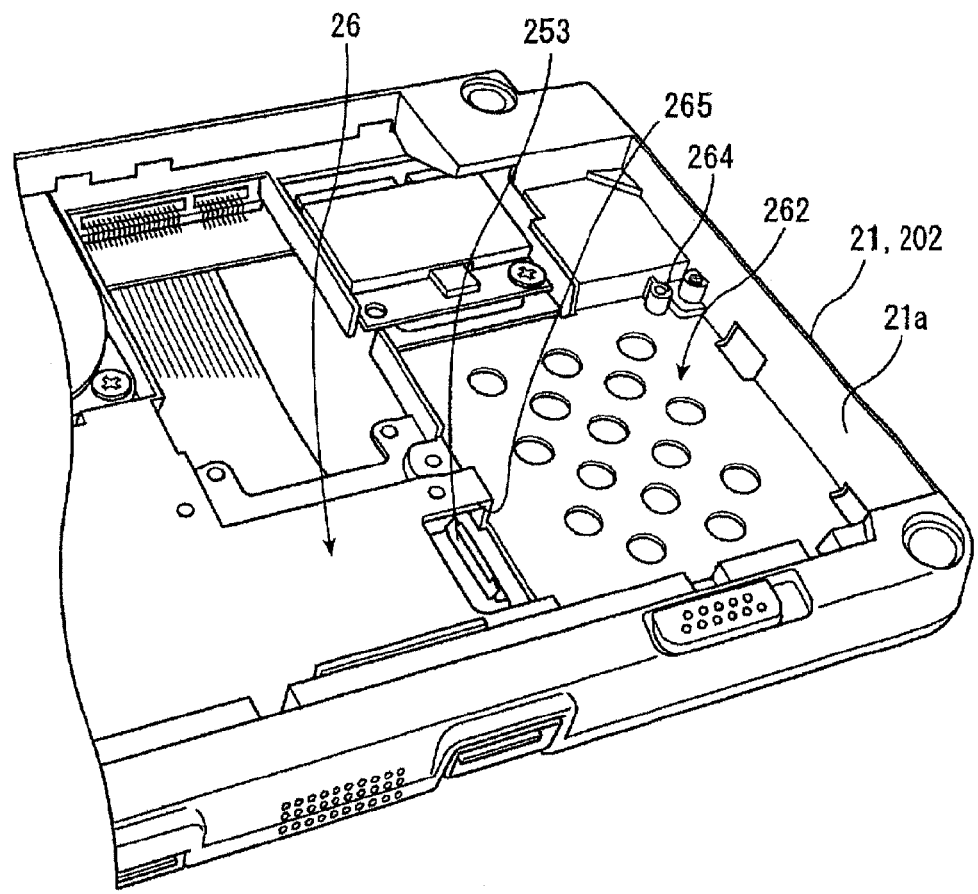
FIG. 11 is a perspective view illustrating a SSD receiving part of a chassis inside the main unit of the lap-top PC.

FIG. 11 is a perspective view illustrating the SSD receiving part of the chassis inside the main unit of the lap-top PC.

The SSD receiving part 262 is formed on the chassis 26. The SSD receiving part 262 is provided in a region outside a region in which the circuit board 25 fixed to the chassis 26 as illustrated in FIGS. 6 and 8 is accommodated within the main housing 21, in the in-plane direction of the circuit board 25. The main housing 21 includes a sidewall 21a extending vertically with respect to the in-plane direction of the circuit board 25. The sidewall 21a cooperates with the SSD receiving part 262 in order to stably hold the SSD 28. An opening 265 is formed immediately beside the SSD receiving part 262 of the chassis 26, in order to enable connection to the connector 253 mounted on the circuit board 25. The connector 253 faces the SSD receiving part 252, and the FPC 41 illustrated in FIG. 10(A) is plugged into the connector 253 from the side of the SSD receiving part 252. A boss 264 formed with a screw hole is provided in a corner of the SSD receiving part 262.

Figure 12:
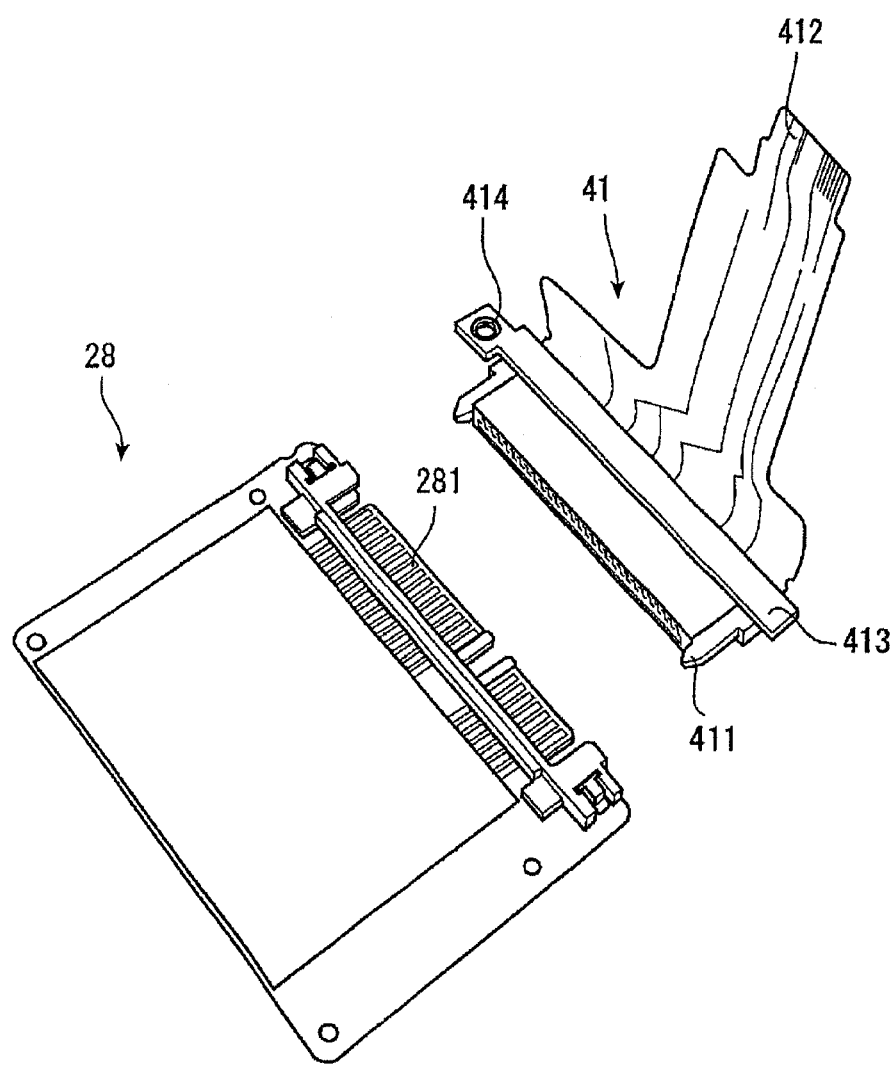
FIG. 12 is a perspective view illustrating a SSD and a FPC.
Figure 13:
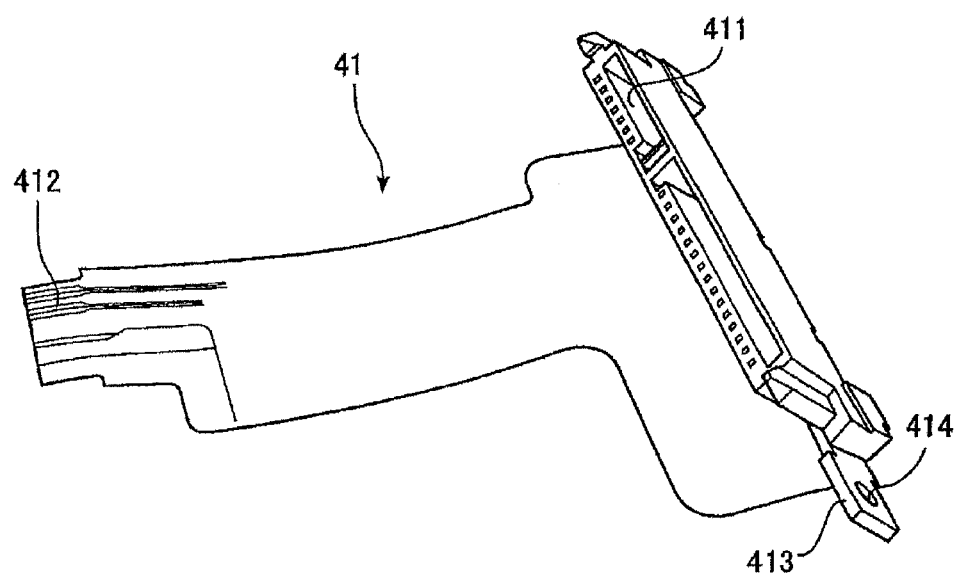
FIG. 13 is a perspective view illustrating the FPC viewed from an angle different from that of FIG. 12.

FIG. 12 is a perspective view illustrating the SSD and the FPC. In addition, FIG. 13 is a perspective view illustrating the FPC viewed from an angle different from that of FIG. 12.

The SSD 28 has a plate shape as a whole, and a connector 281 is formed on one side surface of the SSD 28. The SSD 28 is an example of a large-capacity information storage unit having a large storage capacity, similar to the conventional HDD that is popularly used as the large-capacity information storage unit.

A connector 411 to connect to the connector 281 of the SSD 28 is fixed on one end of the FPC 41. A connector (or terminal array) 412 to connect to the connector 253 of the circuit board 25 is provided on the other end of the FPC 41. The FPC 41 is an example of a cable part, and includes a plurality of wirings (or interconnections) formed thereon to connect the connector 411 and the connector 412 on the opposite ends thereof.

A reinforcing plate 413 is fixed at a position adjacent to the connector 411 on the FPC 41. A hole 41 to be used for fixing is provided in a part of the reinforcing plate 413 protruding to the side. The hole 41 overlaps the screw hole of the boss 264 provided at the corner of the SSD receiving part 262, in a state in which the SSD 28 connected to the connector 411 of the FPC 41 is accommodated within the SSD receiving part 262, and the FPC 41 and the SSD 28 are fixed to the SSD receiving part 262 by a screw that is screwed into the hole 41 and the screw hole of the boss 264.

Figure 14:
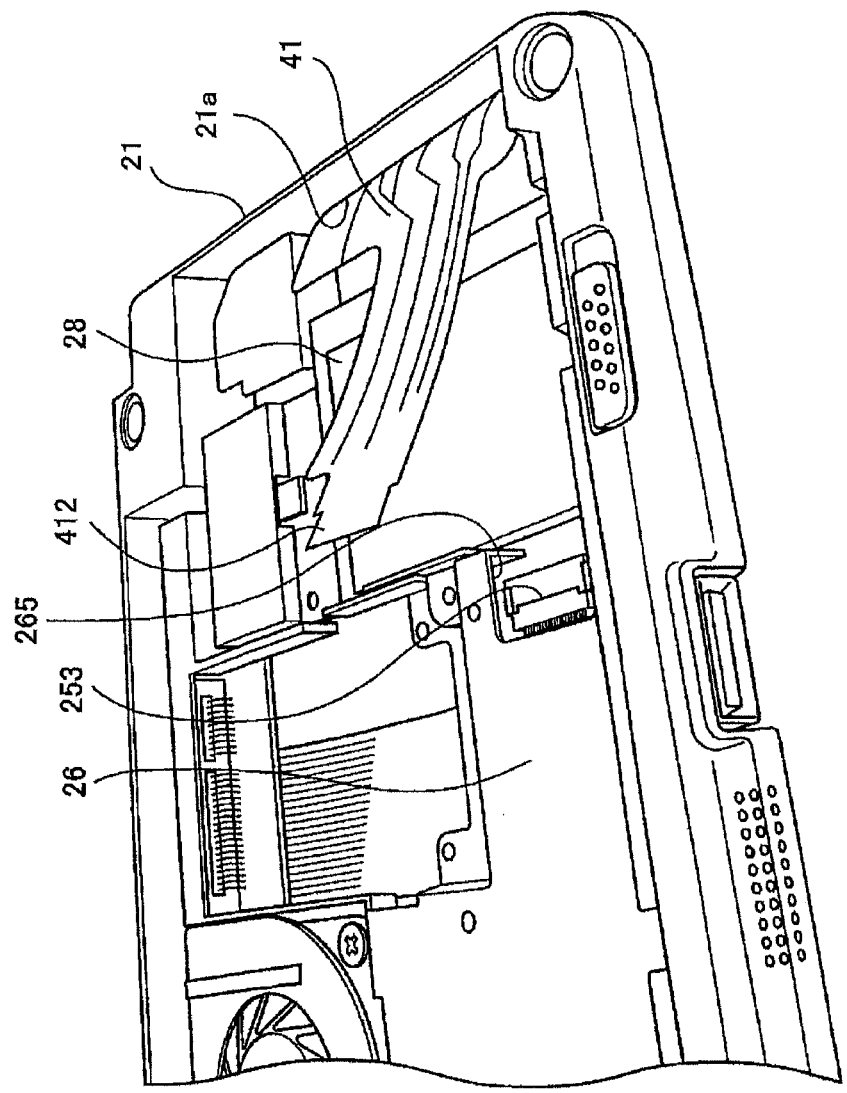
FIG. 14 is a perspective view illustrating a state in which the SSD is accommodated in the SSD receiving part.

FIG. 14 is a perspective view illustrating a state in which the SSD is accommodated in the SSD receiving part.

The SSD 28 is accommodated within the SSD receiving part 262 in a state in which the connector 281 illustrated in FIG. 12 is connected to the connector 411 of the FPC 41. The SSD 28 is accommodated within the SSD receiving part 262 in a position such that the connector 281 of the SSD 28 faces the sidewall 21a of the main housing 21. That is, when the side of the connector 281 is regarded as the front surface side of the SSD 28, the SSD 28 is accommodated within the SSD receiving part 262 in the position such that the back of the SSD 28 faces the connector 253 of the circuit board 25.

The FPC 41 bends upwards (on the bottom surface side of the lap-top PC 10) in FIG. 14 on one end where the connector 411 and the reinforcing plate 413 are arranged. The bent FPC 41 passes a path overlapping the SSD 28, and the connector 412 on the other end reaches the connector 253 on the circuit board 25.

Figure 15:
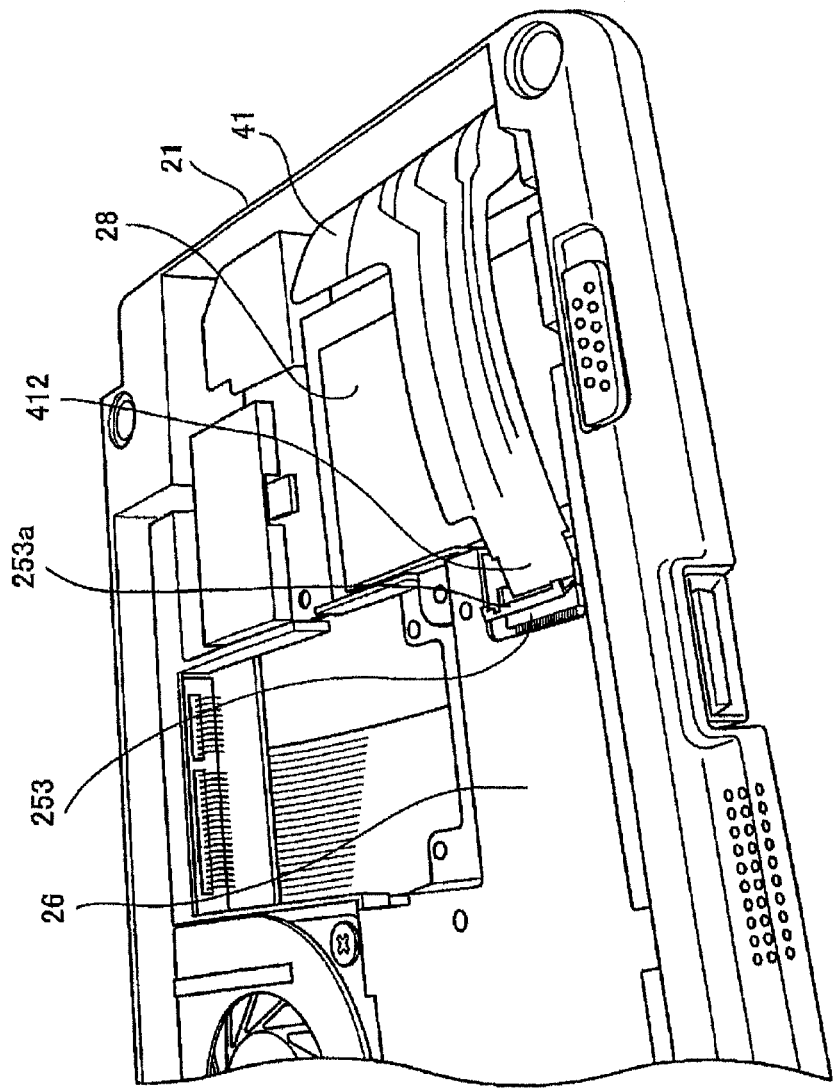
FIG. 15 is a perspective view illustrating how the FPC is connected to a connector on the circuit board.

FIG. 15 is a perspective view illustrating how the FPC is connected to the connector on the circuit board. In addition, FIG. 16 is a perspective view illustrating a state in which the FPC is connected to the connector on the circuit board.

When connecting the connector 412 of the FPC 41 and the connector 253 of the circuit board 25, a lid 253a of the connector 253 is opened as illustrated in FIG. 15, and the connector 412 of the FPC 41 is plugged into (or inserted into) the connector 253. Thereafter, the lid 253a of the connector 253 is closed, and as a result, circuits on the circuit board 25 are electrically connected to the SSD 28.

Figure 16:
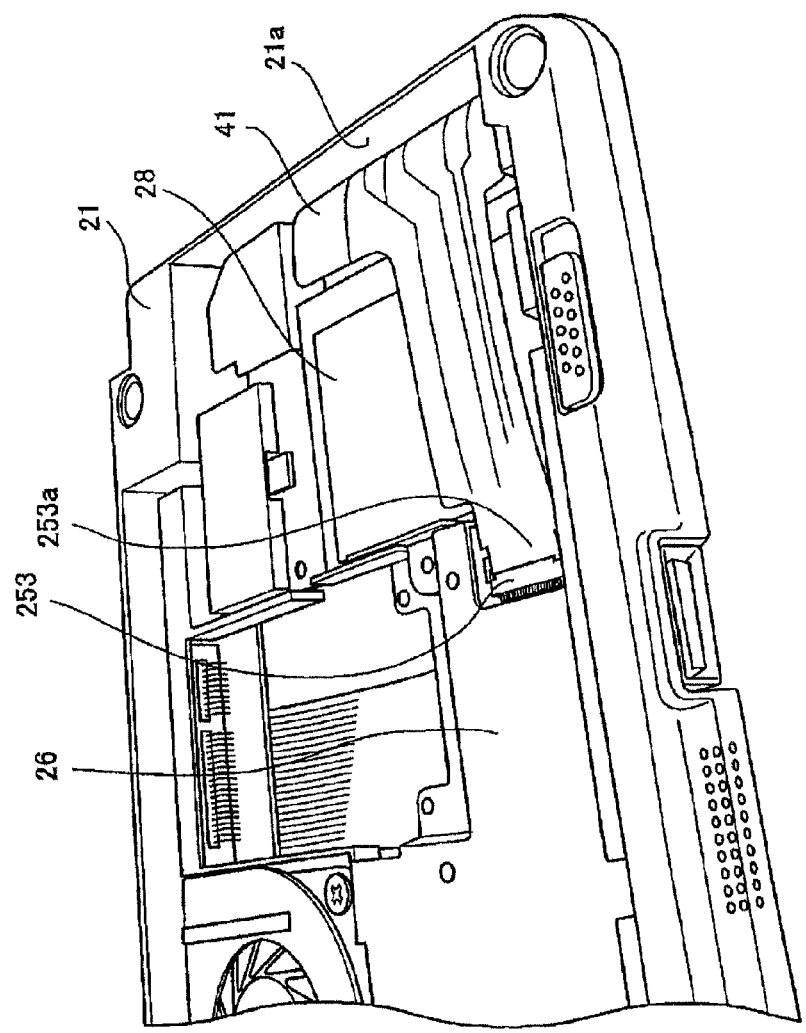
FIG. 16 is a perspective view illustrating a state in which the FPC is connected to the connector on the circuit board.

As described above, the battery pack 24 illustrated in FIGS. 6 and 10 is placed on the structure illustrated in FIG. 16. Hence, the FPC 41 is pressed by the battery pack 24 towards the SSD 28. Because the FPC 41 is pressed by the battery pack 24, the SSD 28 is prevented from floating or lifting from the SSD receiving part 262, and the SSD 28 is stably held within the SSD receiving part 262. In addition, the external surface of the battery pack 24 forms the bottom surface of the main unit 20.

When the lap-top PC 10 is placed on a table or the like, the bottom surface of the lap-top PC 10 may be subjected to various kinds of shock. But because the FPC 41 is interposed between the SSD 28 and the battery pack 24 forming the bottom surface of the main unit 20, the FPC 41 acts as a cushion. Consequently, even when shock is applied to the bottom surface of the main unit 20, the shock is uneasily transferred to the SSD 28, and the SSD 28 is protected from the shock. In addition, the SSD 28 is accommodated in the region adjacent to the sidewall 21a of the main housing 21, in a position in which the connector 281 of the SSD 28 faces the sidewall 21a, and the connector 281 is connected to the connector 411 of the FPC 41 in a narrow region. Because of the SSD 28 is arranged at such a position and the FPC 41 is pressed by the battery pack 24, the connectors 281 and 411 are prevented from becoming disconnected from each other. For this reason, the SSD 28 is stably held within the SSD receiving part 262 even though only one part of the FPC 41 (the hole 414 in the reinforcing plate 413 in FIG. 12) adjacent to the part connected to the connector 281 of the SSD 28 is fixed.

Although the SSD 28 is stably held by the structure described above, an electronic part other than the SSD 28, such as a CompactFlash (registered trademark of SanDisk), may be stably held by the structure described above.

[Cooling Structure]

Figure 17:
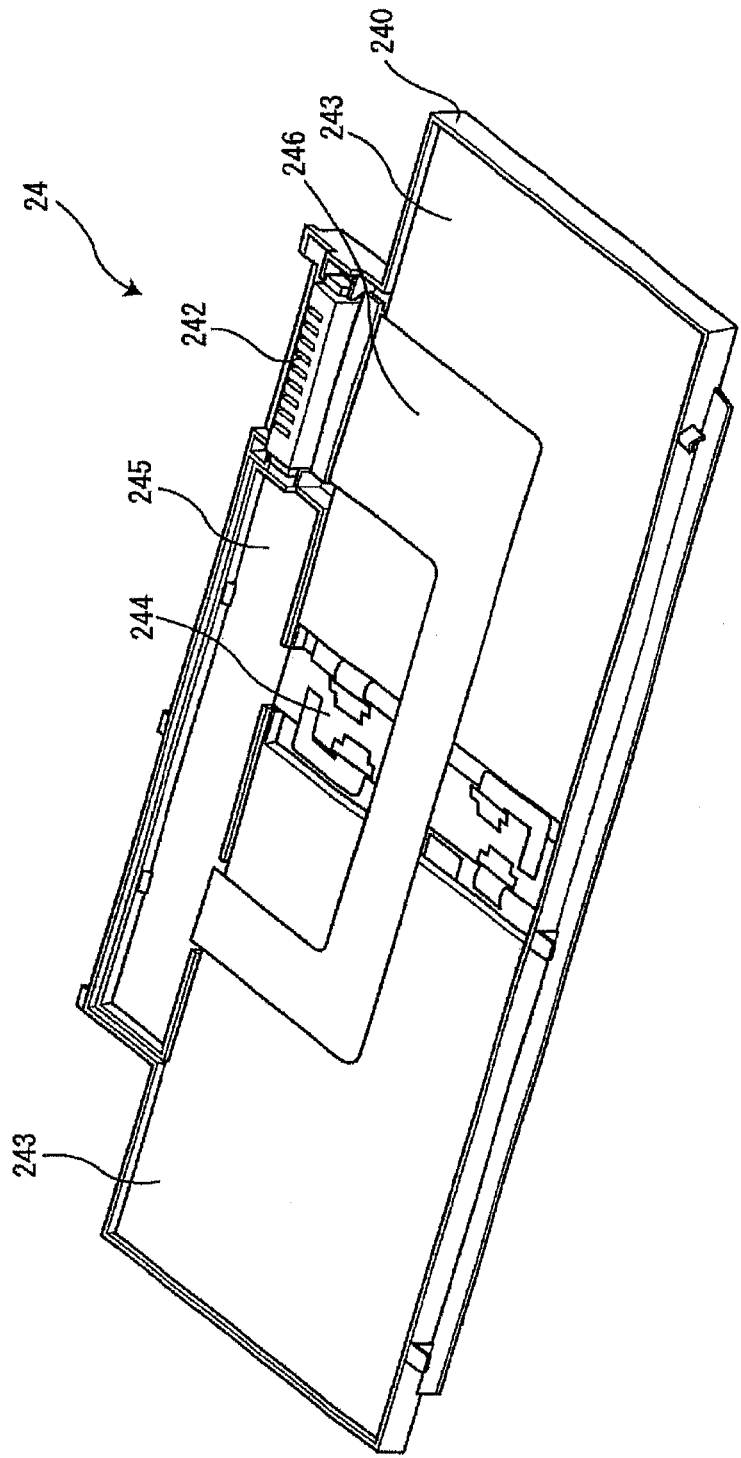
FIG. 17 is a perspective view illustrating the battery pack viewed from a first surface side thereof.

FIG. 17 is a perspective view illustrating the battery pack viewed from the first surface side thereof. FIG. 17 illustrates an internal structure that is visible in a perspective through a cover on the first surface side.

The battery pack 24 includes a cover member 240 that covers the entire battery pack 24, and two battery cells 243 arranged on the right and left within the cover member 240. A region in which no battery cell 243 is provided is located between the two adjacent battery cells 243. FIG. 17 illustrates a perspective of a part of the cover member 240 on the first surface side facing the inside of the main unit 20. Each of the battery cells 243 has charging and discharging terminals arranged on one side surface thereof. The battery cells 243 are arranged so that the charging and discharging terminals thereof oppose each other. In this example, a FPC 244, which forms the wiring to enable charging and discharging of the battery cells 243, is arranged in a gap between the adjacent battery cells 243. The battery pack 24 further includes a control circuit board 245 mounted with a control circuit to control the charging and discharging of the battery cells 243. The FPC 244 connects the control circuit board 245 and the terminals of the two battery cells 243. Another FPC 246 connects the control circuit board 245 and the connector 242, in order to exchange power and control signals between the battery pack 24 and the outside.

The FPC 244 extending in the gap between the two adjacent battery cells 243 is thinner than the battery cells 243. Hence, this thinness of the FPC 244 in the gap may be utilized form the recess 241 illustrated in FIGS. 6 and 10 in the cover member 240 that covers the first surface (inner surface of the main unit 20), in order to contribute to a smooth air flow within the main unit 20.

In other words, the first surface of the battery pack 24 is arranged with a slight gap from the chassis 26, in order to oppose the chassis 26 illustrated in FIGS. 6 and 10 that supports the circuit board 25 as described above. The recess 241 is formed to partially spread (or widen) the gap, and the inner part of the recess 241 extends to the position overlapping the fan 27 illustrated in FIGS. 6 and 10, for example. The recess 241 secures the smooth air flow. In this embodiment, the FPC 246 connecting the control circuit board 245 and the connector 242 traverses the gap between the two adjacent battery cells 243, and an intermediate part of the recess 241 in the first surface of the battery pack 24 is partitioned by the FPC 246. However, even though the intermediate part of the recess 241 is partitioned by the FPC 246, the provision of the recess 241 smoothens the air flow within the main unit 20 and improve the heat radiating efficiency (or cooling efficiency).

As described above, the second surface of the battery pack 24, on the opposite side of the first surface illustrated in FIG. 17, forms the bottom surface of the main unit 20.

Figure 18:
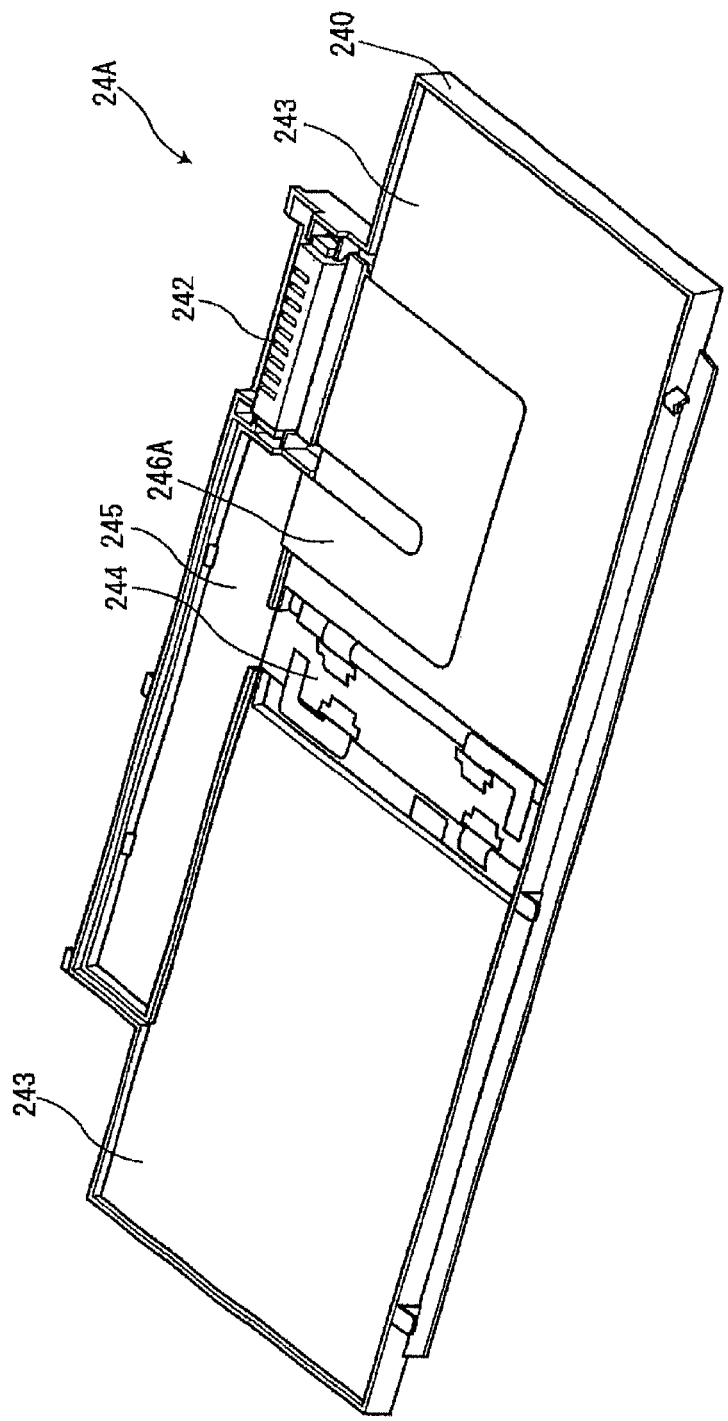
FIG. 18 is a perspective view illustrating a modification of the battery pack viewed from the first surface side thereof.

FIG. 18 is a perspective view illustrating a modification of the battery pack viewed from the first surface side thereof. In FIG. 18, those parts that are the same as those corresponding parts in FIG. 17 are designated by the same reference numerals, and a description thereof will be omitted.

In a battery pack 24A illustrated in FIG. 18, a FPC 246A connects the control circuit board 245 and the connector 242 via a path that does not traverse the gap between the two adjacent battery cells 243. For this reason, the recess 241 formed in the first surface of the battery pack 24A may extend linearly without being partitioned. In this case, the air flow within the main unit 20 is further improved, and a further improvement of the heat radiating efficiency (or cooling efficiency) may be expected.

Figure 19:
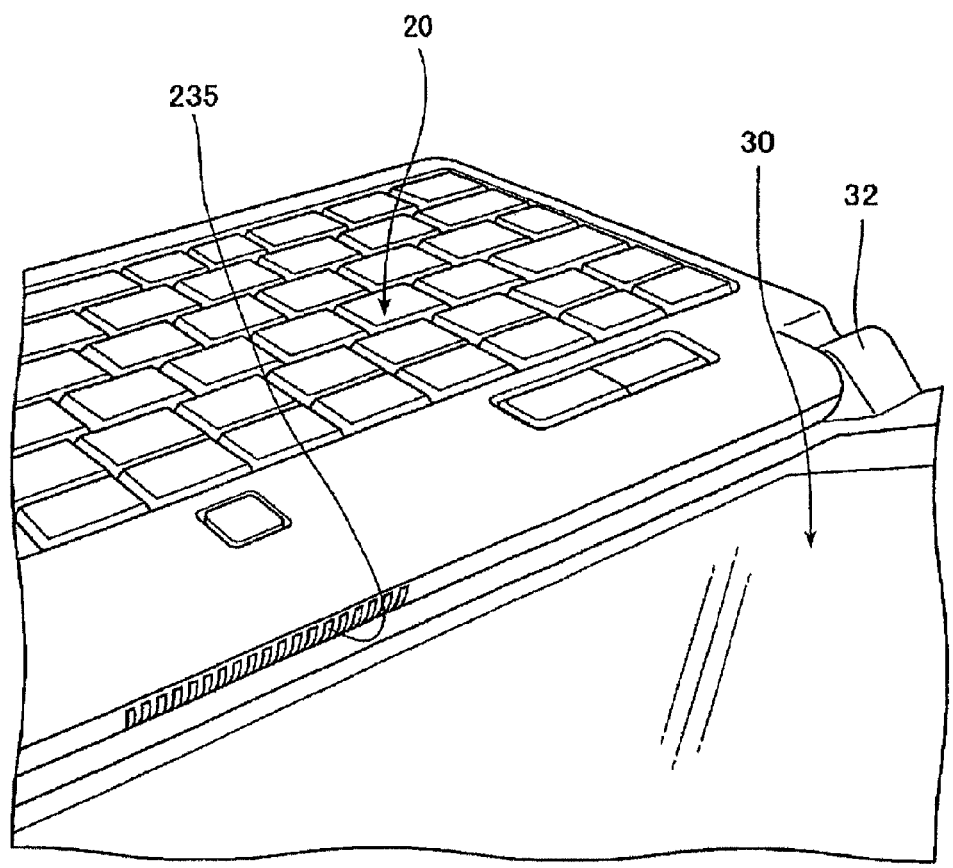
FIG. 19 is a perspective view illustrating the end surface on the rear side of the main unit of the lap-top PC in the state in which the lid is open and the inside (front surface side of a LCD unit) is exposed.

FIG. 19 is a perspective view illustrating the end surface on the rear side of the main unit of the lap-top PC in the state in which the lid is open and the inside (front surface side of the LCD unit) is exposed.

The display apparatus 30 is rotatably (or pivotally) supported on the main unit 20, and may open and close. The air outlet 235 illustrated in FIGS. 4 and 5 is formed in the rear end surface of the main housing 21, at the upper central part thereof.

In the closed state of the display apparatus 30, the closed display apparatus 30 is located on the main unit 20 and the air outlet 235 is released towards the rear as illustrated in FIG. 4. On the other hand, in the open state of the display apparatus 30, the lower part of the front surface of the display housing 31 of the LCD unit 332 is separated from the air outlet 235 and opposes the air outlet 235.

Figure 20:
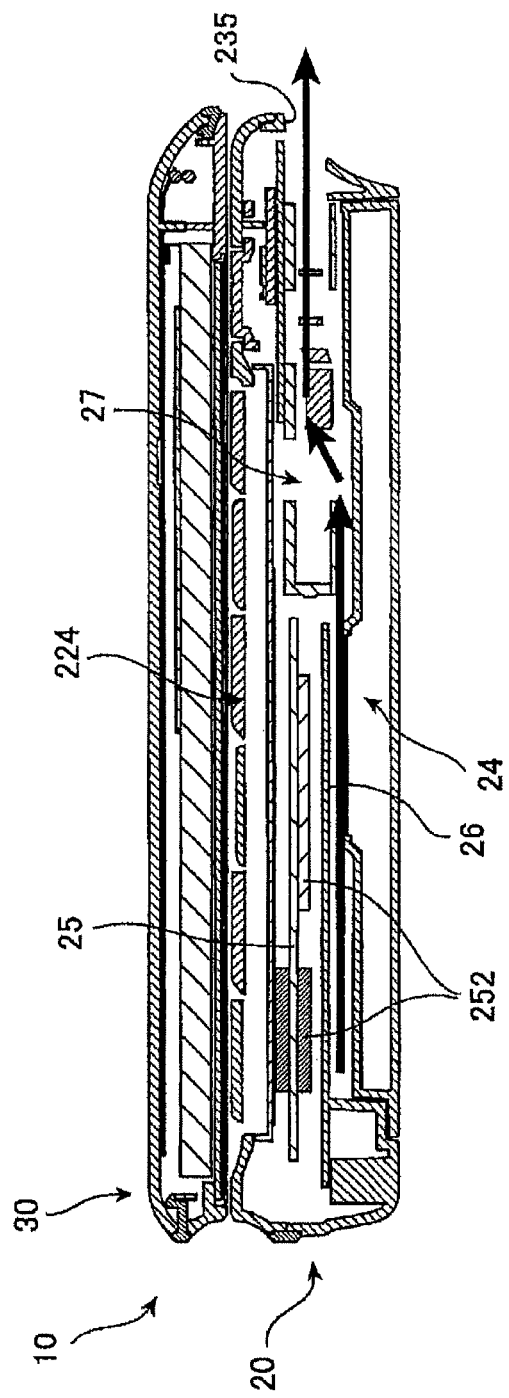
FIG. 20 is a cross sectional view of the lap-top PC in the state where the lid is closed, along a depth direction.
Figure 21:
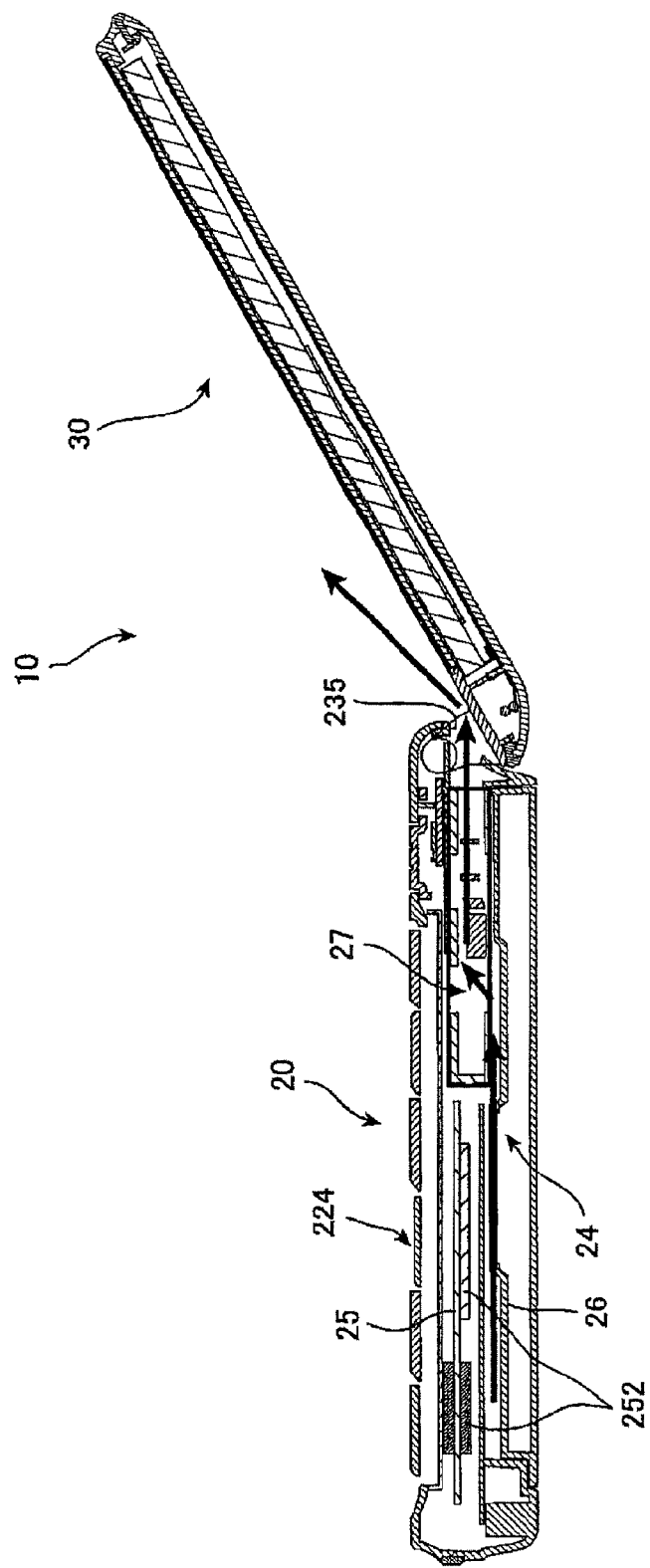
FIG. 21 is a cross sectional view of the lap-top PC in the state where the lid is open, along the depth direction.

FIG. 20 is a cross sectional view of the lap-top PC in the state where the lid is closed, along a depth direction, and FIG. 21 is a cross sectional view of the lap-top PC in the state where the lid is open, along the depth direction. FIGS. 20 and 21 schematically illustrate the air flow within the main unit 20.

When the display apparatus 30 of the lap-top PC 10 is closed, the air within the main unit 20 flows between the chassis 26 and the battery pack 24 as illustrated by arrows in FIG. 20, and is sucked by the fan 27 and then exhausted via the air outlet 235. Although the arrows in FIG. 20 illustrate the air flow in the region sandwiched between the chassis 26 and the battery pack 24, the air also flows through other regions, such as a region between the chassis 26 and the circuit board 25 and regions or gaps between the various parts, before being sucked by the fan 27 and then exhausted via the air outlet 235.

The lap-top PC 10 may be used as a music player. The lap-top PC 10 may carry out a process in the close state thereof when the lap-top PC 10 is being used as the music player, or when the process does not require a screen display. The fan 27 may operate also during the process carried out in the closed state of the lap-top PC 10, in order to generate the air flow illustrated in FIG. 20.

On the other hand, when the display apparatus 20 of the lap-top PC 10 is open, the air flow within the main unit 20 is the same as the case in which the display apparatus 20 of the lap-top PC 10 is closed, however, the air exhausted via the air outlet 235 flows along the front surface of the display apparatus 30, as indicated by arrows in FIG. 21. The lap-top PC 10 may be held in one hand by both hands of the user, instead of being placed on a table, for example, when the lap-top PC 10 is relatively small. In this case, if the air exhausted via the air outlet 235 were to reach a person nearby, other than the user, the air flow may make this person uncomfortable. Hence, in the open state of the lap-top PC 10, which is the mode of use in most cases, the air exhausted from the air outlet 235 is guided to flow along the front surface of the display apparatus 30 in order to reduce the possibility of making people nearby uncomfortable by the air flow.

On the other hand, in the closed state of the lap-top PC 10, the air exhausted from the air outlet 235 flows in the depth direction of the main unit 20 as illustrated in FIG. 20. However, when the lap-top PC 10 is used in the closed state thereof, the lap-top PC 10 in most cases is set on the table or held in a vertical state, for example, and the possibility of the air exhausted from the air outlet 235 reaching people nearby is small. For this reason, even though the lap-top PC 10 may be used in the closed state thereof, the possibility of making people nearby uncomfortable by the air flow is small. Furthermore, if the lap-top PC 10 is mostly used in the open state thereof, the air exhausted from the air outlet 235 does not create problems from the point of view of the possibility of making people nearby uncomfortable by the air flow.

[Hinge Cap Mounting Structure]

Figure 22:
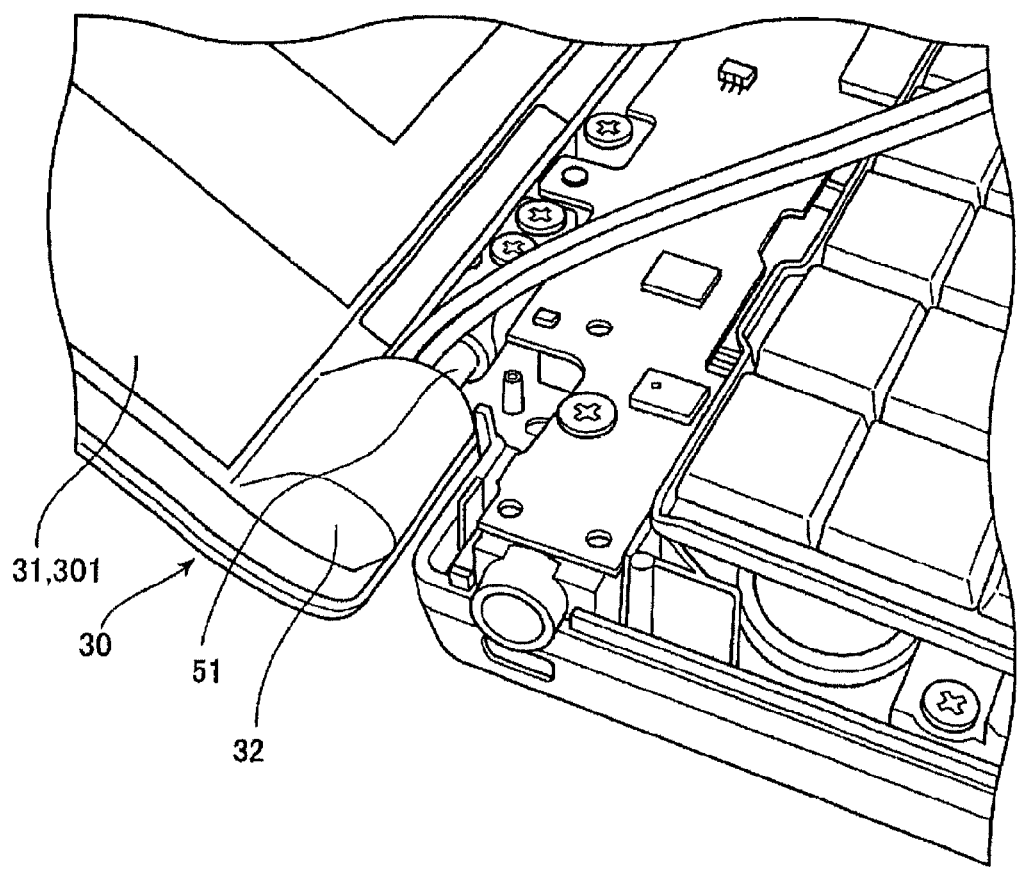
FIG. 22 is a perspective view illustrating a left hinge cap and a structure around the left hinge cap.

Next, a description will be given of a mounting structure of the hinge cap which covers the hinge part rotatably (or pivotally) joining the display apparatus and the main unit. FIG. 22 is a perspective view illustrating a left hinge cap and the structure around the left hinge cap.

The left hinge cap 32 is fixed on the display housing 31 of the display apparatus 30, and covers a left end part of a left hinge part 51. A right end part of the hinge part 51 is rotatable with respect to the left end part of the left hinge part 51 with a friction, and is fixed to a member of the main unit 20 by a screw. The pair of the hinge part 51 and the hinge cap 32 exists on both the right and left ends as illustrated in FIG. 8.

Figure 23:
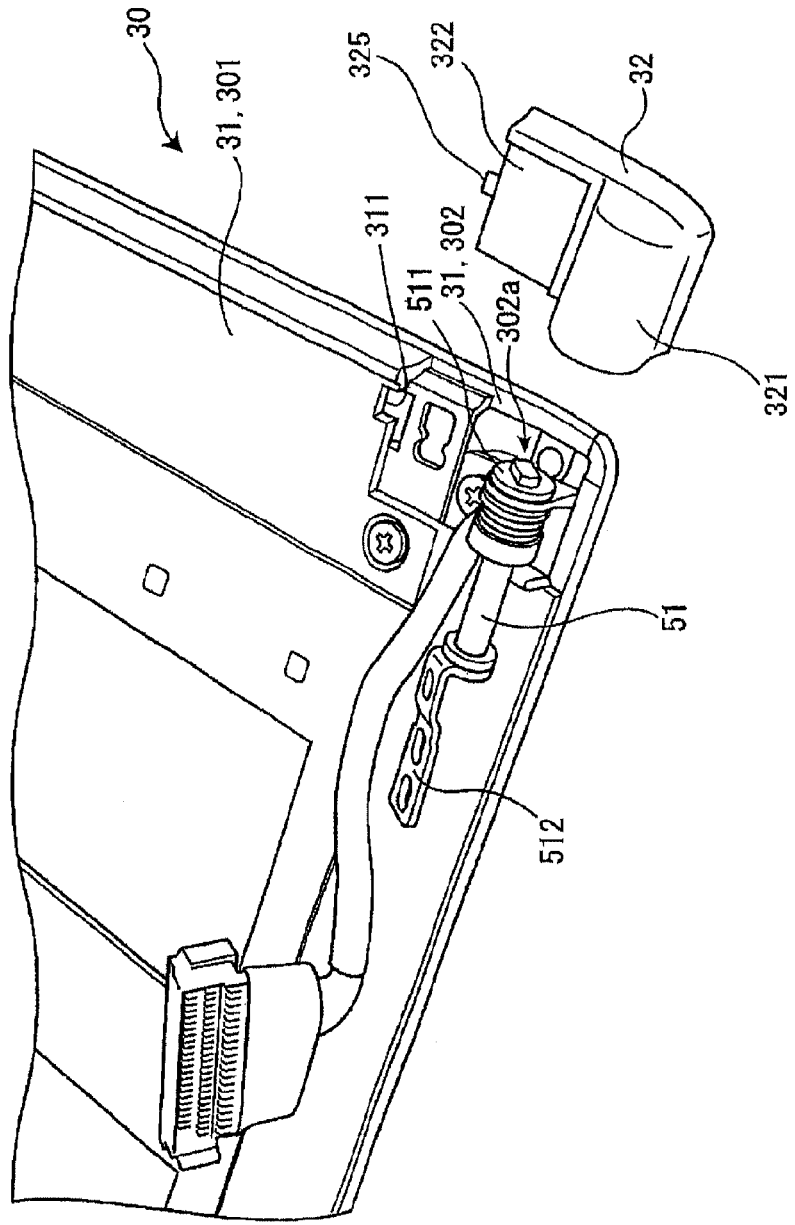
FIG. 23 is a diagram illustrating a right hinge structure of the lap-top PC in a state in which a right hinge cap covering a right hinge part is removed and illustrated beside the right hinge structure.

FIG. 23 is a diagram illustrating a right hinge structure of the lap-top PC in a state in which a right hinge cap covering a right hinge part is removed and illustrated beside the right hinge structure.

The hinge part 51 is fixed to an inner surface (hereinafter also referred to as a "fixing surface") of the rear cover part 302 covering the rear surface of the display housing 31 that forms the display apparatus 30. A right end part 511 of the right hinge part 51 is covered by the hinge cap 32, and a left end part 512 of the right hinge part 51 is fixed to a member of the main unit 20 by a screw. The left end part 512 of the right hinge part 51 is rotatable with respect to the right end part 511 of the right hinge part 51 with a friction.

The hinge cap 32 has a bulge part 321 covering the right end part 511 of the hinge part 51, and a supported part 322 extending from the bulge part 321 and supported by the front cover part 301 forming the front surface of the display apparatus 30. In addition, the hinge cap 32 has a locking claw 325 projecting from the supported part 322 in a direction parallel to the front surface of the display apparatus 20. The hinge cap 32 may be mounted on the display housing 31 of the display apparatus 30 by carrying out a first operation and a second operation that follows the first operation, as described hereinafter. The first operation presses the hinge cap 32 against the display housing 31 in a state in which the hinge cap 32 faces an inner surface 302*a* of the rear cover 302 that forms the display housing 31 of the display apparatus 30, and the locking claw 325 of the hinge cap 32 is fitted into an opening 311 provided in the front cover part 311. The second operation that follows the first operation slides the hinge cap 32 along the surface of the display housing 31 towards the left in FIG. 23. By the first and second operations described above, the hinge cap 32 is mounted on the front cover part 301 of the display housing 31.

The pairs of the hinge part and the hinge cap respectively provided on the right and left ends of the lap-top PC 10 are symmetrical to each other with respect to the right and left. For this reason, structures related to the hinge part 51 will be described hereinafter by referring to the right hinge part 51 illustrated in FIG. 23.

Figure 24:
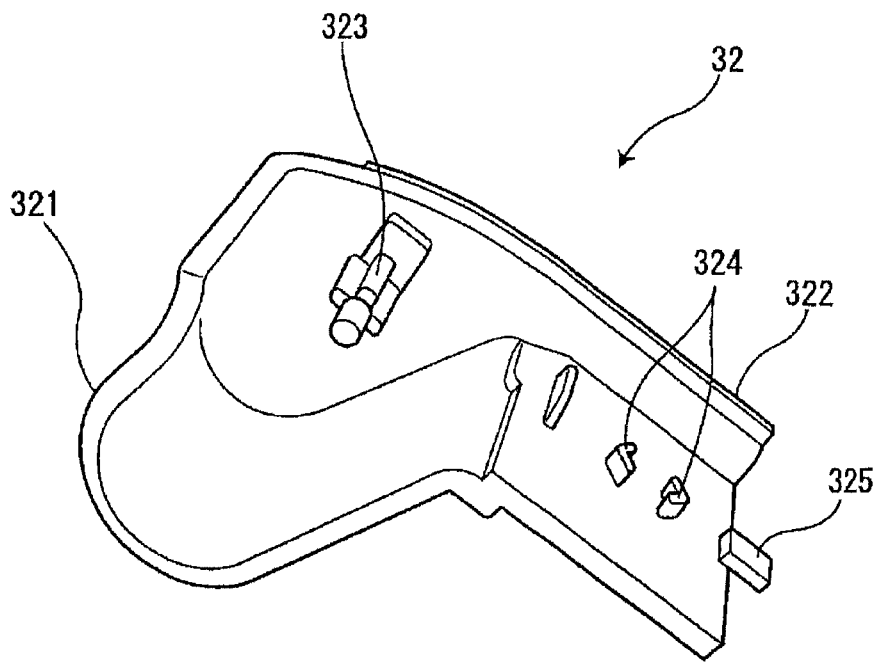
FIG. 24 is a perspective view illustrating an inside of the hinge cap.

FIG. 24 is a perspective view illustrating an inside of the hinge cap 32. The hinge cap 32 includes an engaging pin 323 that projects laterally towards the inside of the bulge part 321. The hinge cap 32 also includes a pair of locking projections 324 provided on the inner side of the supported part 322 and projecting towards the front surface of the display apparatus 30. The hinge cap 32 further includes the locking claw 325 projecting from the supported part 322 in a direction along the front surface of the display apparatus 30.

Figure 25:
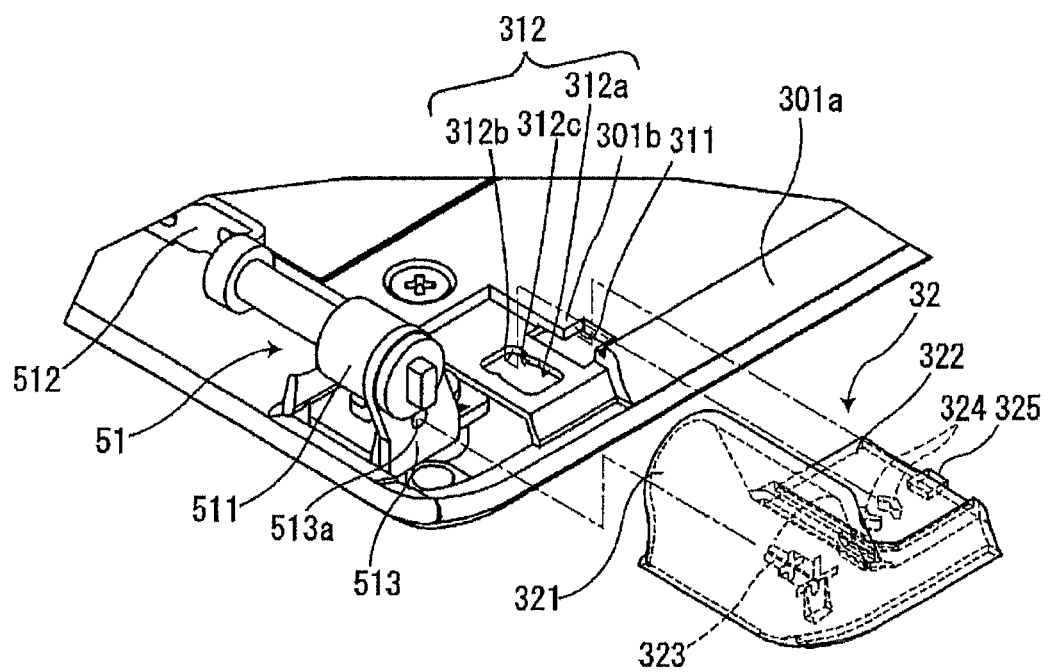
FIG. 25 is a diagram illustrating a mounting structure of the hinge cap.
Figure 26:
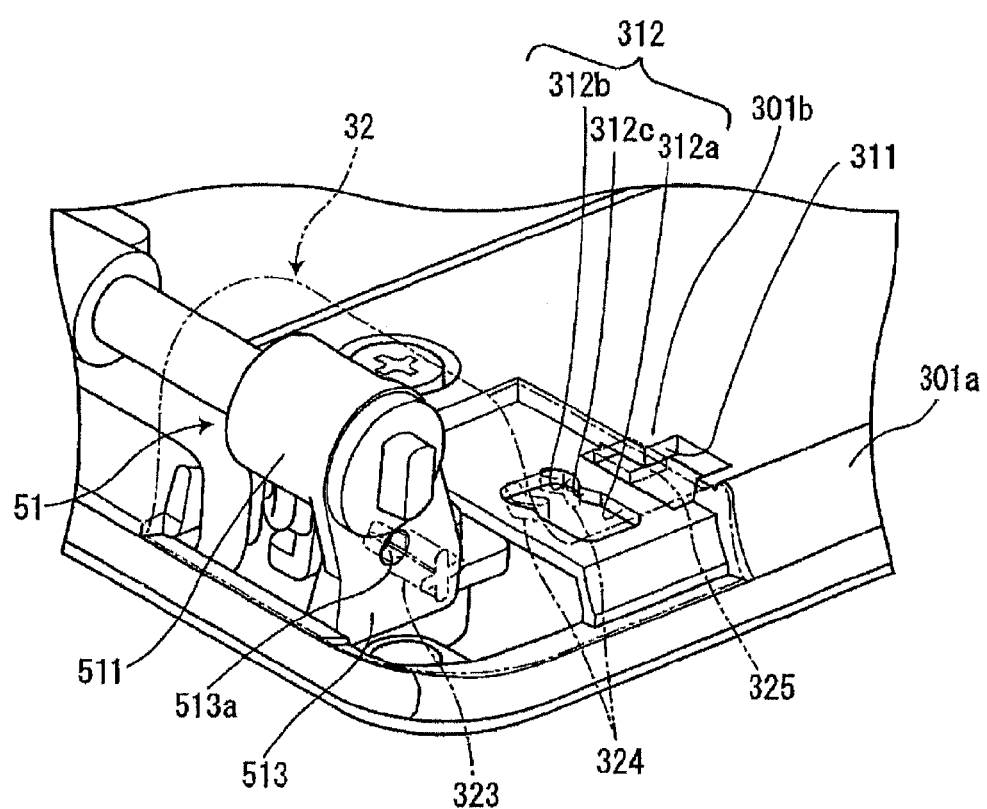
FIG. 26 is a schematic diagram illustrating a state in which the hinge cap is mounted on the hinge part.

FIG. 25 is a diagram illustrating a mounting structure of the hinge cap. FIG. 25 illustrates the structure on the inner side of the hinge cap 32 by dotted lines. In addition, FIG. 26 is a schematic diagram illustrating a state in which the hinge cap is mounted on the hinge part. FIG. 26 illustrates the hinge cap 32 by a two-dot chain line.

The locking claw 325 of the hinge cap 32 enters the opening 311 by carrying out the first operation described above, and enters under a plate member 301*b* forming the front surface 301*a* of the front cover part 301 by carrying out the second operation described above, in order to prevent the floating or lifting of the hinge cap 32 from the front cover part 301. A locking structure formed by the opening 311 and the plate member 301*b* will hereinafter also be referred to as a lock receiving part.

A locking opening 312, other than the opening 311, is also provided in the front cover part 301 of the LCD unit 332. The locking opening 312 includes a first receiving part 312*a* to receive the pair of locking projections 324 provided on the hinge cap 32 when the first operation is carried out, and a second receiving part 312*b* to receive the pair of locking projections 324 when the second operation is carried out. The locking opening 312 further includes a narrow part 312*c* that is provided between the first receiving part 312*a* and the second receiving part 312*b* and has a width narrower than those of the first receiving part 312*a* and the second receiving part 312*b*. The pair of locking projections 324 provided on the hinge cap 32 are separated by a distance corresponding to the widths of the first receiving part 312*a* and the second receiving part 312*b*. Hence, the pair of locking projections 324 are resiliently deformed when passing the narrow part 312*c* due to the resistance provided by the narrow part 312*c*. In other words, the narrow part 312*c* acts as a barrier, and the pair of locking projections 324 must resiliently ride over the barrier provided by the narrow part 312*c* when moving from the first receiving part 312a into which the pair of locking projections 324 enter when the first operation is carried out to the second receiving part 312b to which the pair of locking projections 324 move when the second operation is carried out. Hence, the hinge cap 32 after the second operation is fixed with respect to the display housing 31 of the display apparatus 30, so that the hinge cap 32 may not easily separate from the display housing 31.

Further, the hinge part 51 includes a support part 513 to support the right end part 511. The support part 513 is provided on the display housing 31, and includes an engaging hole 513a. On the other hand, the engaging pin 323 provided on the hinge cap 32 projects in the sliding direction of the second operation, and the engaging pin 323 enters and engages the engaging hole 513a when the second operation is carried out. Hence, the hinge cap 32 is more firmly fixed to the display housing 31 of the display apparatus 30.

According to the hinge cap of this embodiment, the hinge cap dues not require a screw to fix the hinge cap on the display housing. When the screw is used to fix the hinge cap, a patch part to cover the head of the screw is also required in addition to the screw, and the number of required parts increases. But according to this embodiment, the screw, the patch part and the like are unnecessary for fixing the hinge cap, and the number of required parts and the number of assembling stages required may be reduced.

[Mechanism to Prevent Coming Off of LCD]

Figure 27:
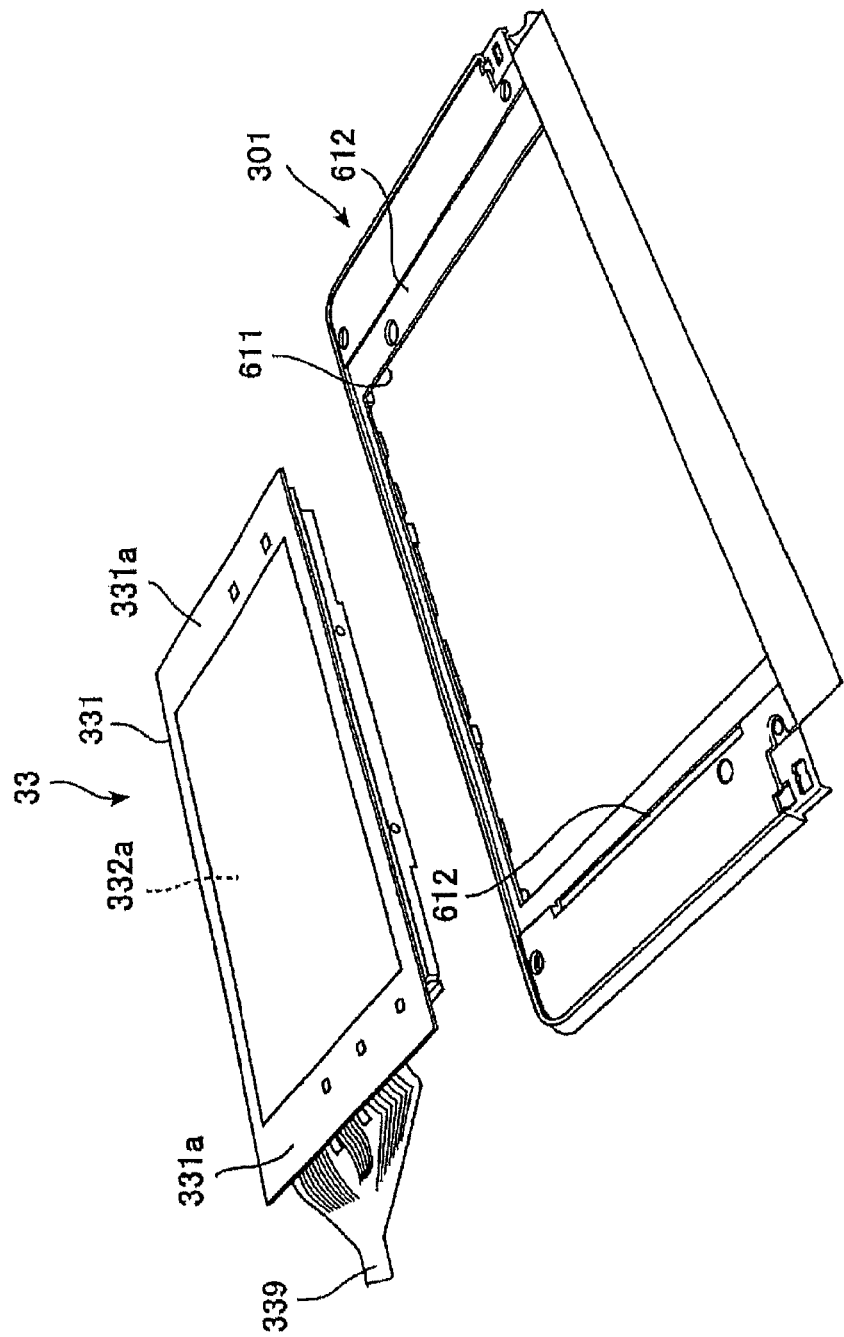
FIG. 27 is a diagram illustrating a front cover part and a display module, forming a display apparatus, in a side by side manner.
Figure 28:
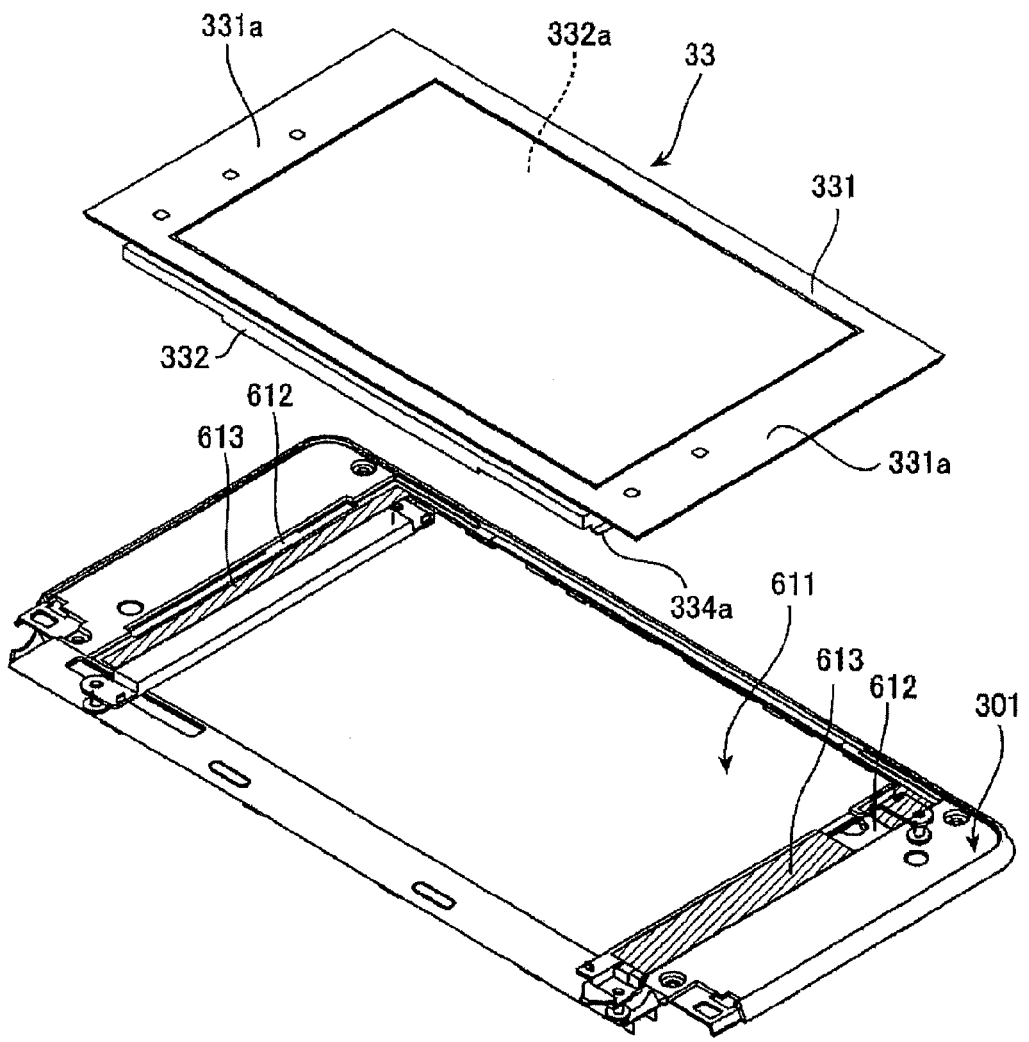
FIG. 28 is a disassembled perspective view illustrating the front cover part and the display mode in an overlapping manner with a gap formed therebetween in an assembling direction.

FIG. 27 is a diagram illustrating the front cover part and the display module, forming a display apparatus, in a side by side manner. In addition, FIG. 28 is a disassembled perspective view illustrating the front cover part and the display mode in an overlapping manner with a gap formed therebetween in an assembling direction. Furthermore, FIG. 29 is a perspective view illustrating the display module viewed from a rear surface side thereof.

The display module 33 includes the LCD unit 332 having the display screen 332a on the front surface thereof, and the touchscreen panel 331 fixed to the front surface of the LCD unit 332. The image displayed on the display screen 332a may be visually confirmed from the front surface of the LCD unit 332 through the touchscreen panel 331. The touchscreen panel 331 has an area larger than that of the LCD unit 332, and as described above, and the right and left parts (or protruding regions) 331a of the touchscreen panel 331 protruding outside the LCD unit 332 may be used to provide the touchscreen type buttons 330 illustrated in FIG. 1.

Figure 29:
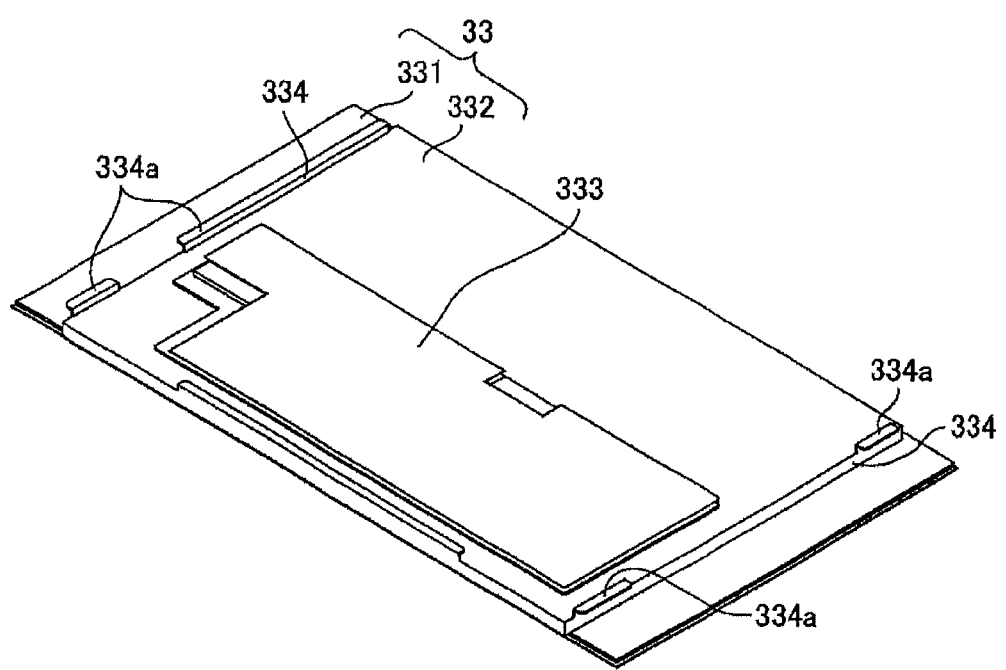
FIG. 29 is a perspective view illustrating the display module viewed from a rear surface side thereof.

As illustrated in FIG. 29, a control circuit board 333 is mounted on a rear surface of the LCD unit 332. the right and left end surfaces of the LCD unit 332 are supported by metal plates 334. Parts of the metal plate 334 separated from the front surface towards the rear surface of the LCD unit 332 are bent outwards in a hook-shape (or an L-shape) to form projecting pieces 334a projecting parallel to the front surface of the LCD unit 332. The projecting pieces 334a are formed at two or more separated positions on each of the metal plates 334. In this example, the separation of the projecting pieces 334a on the right metal plate 334 is larger than the separation of the two projecting pieces 334a on the left metal plate 334, in order to pass a FPC 339 illustrated in FIG. 29 between the opposing projecting pieces 334a. The FPC 339 connects the control circuit board 333 of the display module 33 to the outside.

The entire front surface of the touchscreen panel 331 forming the display module 33 needs to be arranged on the front surface of the display apparatus 30. For this reason, the display module 33 is mounted on the front cover part 301 forming the display apparatus 30 in the following manner.

The front cover part 301 includes an opening 611. The opening 611 has a size that enables the LCD unit 332 forming the display module 33 to pass through, and to cause the protruding regions 331a of the touchscreen panel 331 protruding from the LCD unit 332 to contact the front surface of the front cover part 301. Right and left recesses 612 are provided in the front surface of the front cover part 301 in regions for receiving the right and left protruding regions 331a of the touchscreen panel 331 protruding from the LCD unit 332. The recesses 612 have a depth approximately equal to a thickness of the protruding regions 331a of the touchscreen panel 331. Accordingly, when the protruding regions 331a of the touchscreen panel 331 fit into the recesses 612, the front surface of the display apparatus 30 becomes an approximately flush surface. As illustrated in FIG. 28, a double-sided adhesive tape 613 is adhered on each recess 612, and the protruding region 331a of the touchscreen panel 331 is placed on the double-sided adhesive tape 613 in a state in which the LCD unit 332 is fitted into the opening 611. The double-sided adhesive tape 613 adheres and fixes the display module 33, including the touchscreen panel 331, to the front cover part 401.

In this state, however, the display module 33 may float or be lifted from the front cover part 301 when a force is applied on the rear surface side of the display module 33. Although the rear surface of the display apparatus 30 is covered by the rear cover part 302 illustrated in FIG. 3, the adhesion provided by the double-sided adhesive tape 613 may be insufficient to positively prevent the floating or lifting of the display module 33 from the front cover part 301. Hence, this embodiment employs the following structure in order to prevent the floating or lifting of the display module 33 from the front cover part 301.

Figure 30:
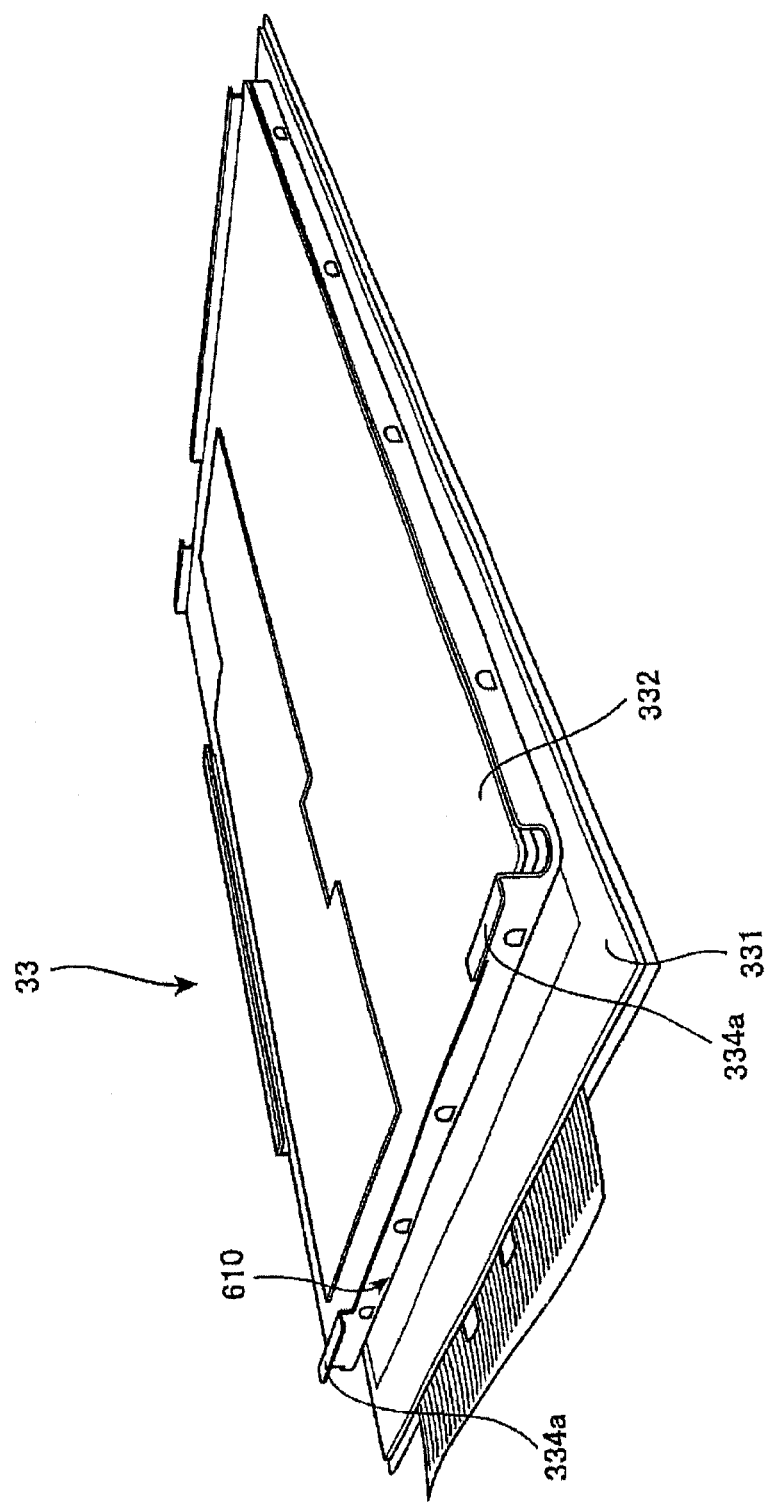
FIG. 30 is a perspective view illustrating a part of one of right and left projecting pieces of the LCD unit.
Figure 31:
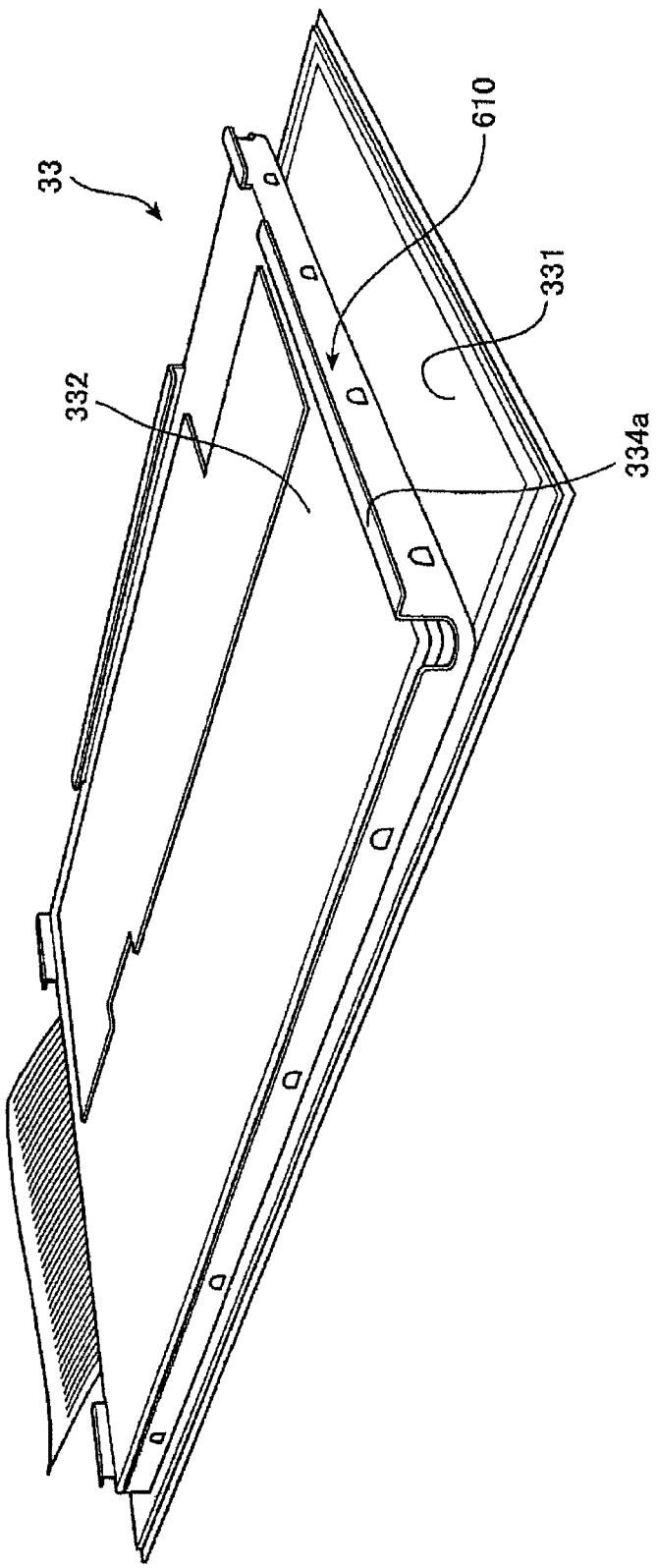
FIG. 31 is a perspective view illustrating a part of the other of the right and left projecting pieces of the LCD unit.

FIG. 30 is a perspective view illustrating a part of one of right and left projecting pieces of the LCD unit, and FIG. 31 is a perspective view illustrating a part of the other of the right and left projecting pieces of the LCD unit.

As illustrated in FIGS. 30 and 31, a gap 610 is formed between the back surface of the touchscreen panel 331 and the right and left projecting pieces 334a. The gap 610 is greater than the thickness of the front cover part 301 at the edge part of the opening 611.

Figure 32:
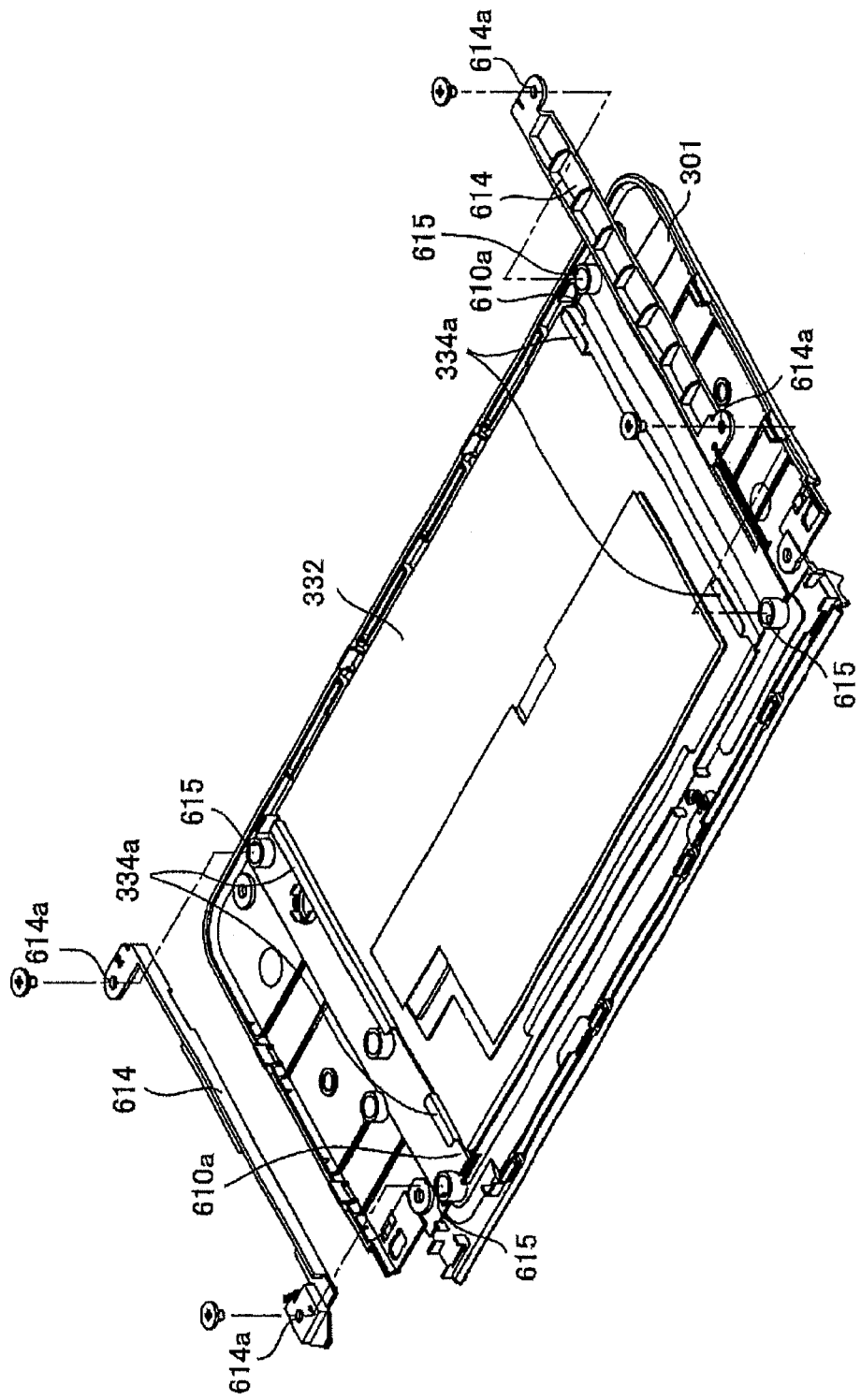
FIG. 32 is a perspective view illustrating a rear surface of the front cover in a stage in which the display module is adhered thereon.
Figure 33:
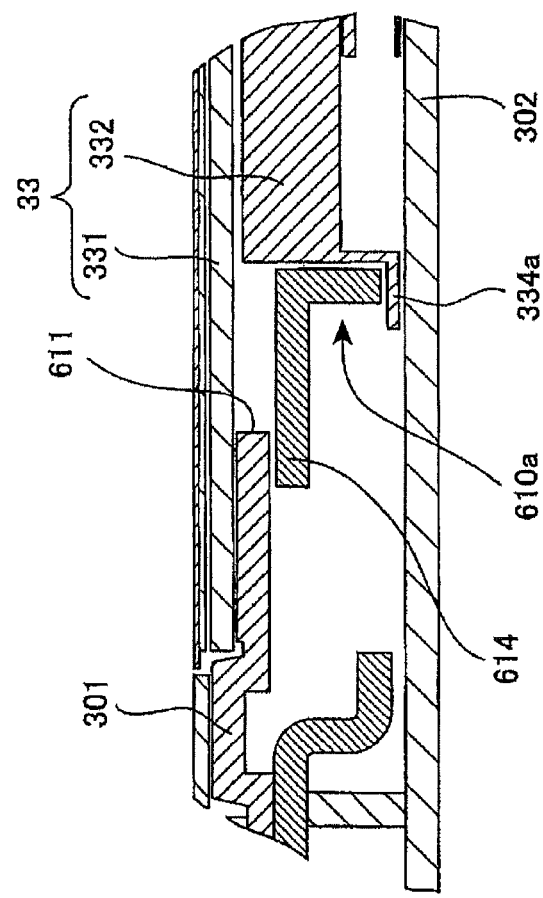
FIG. 33 is a cross sectional view illustrating a part of the display apparatus after assembly.

FIG. 32 is a perspective view illustrating the rear surface of the front cover in a stage in which the display module is adhered thereon, and FIG. 33 is a cross sectional view illustrating a part of the display apparatus after assembly.

In this embodiment, two pressing members 614 are provided. Each pressing member 614 is inserted in corresponding one of the right and left gaps 610a between the rear surface of the front cover part 301 and the projecting pieces 334a. The gap 610a is a remainder gap obtained by subtracting the thickness of the front cover part 301 at the edge part of the opening 611 from the gap 610 illustrated in FIGS. 30 and 31.

Each pressing member 614 includes two screw holes 614a. On the other hand, two bosses 615 each having a screw hole at the center are provided on both the right and left sides on the rear surface of the front cover part 301. When the pressing members 614 are inserted into the corresponding gaps 610a, the pressing members 614 are fixed to the front cover part 301 by matching the screw holes 614a to the screw holes in the bosses 615, and inserting screws into the matched screw holes. In this example, each pressing member 614 is fixed to the front cover part 301 by two screws.

According to the structure described above, the touchscreen panel 331 is prevented from floating or lifting from the front cover part 301 even when a force is applied on the rear surface of the display module 33.

The assembling of the display apparatus 30 is completed by covering the rear surface side of the LCD unit 332 by the rear cover part 302 illustrated in FIGS. 3 and 33, as described above. The display apparatus 30 and the main unit 20 may thereafter be jointed by the hinge, as also described above.

Although the described embodiment uses the LCD unit, it is of course possible to use other types of display units, and the display unit is not limited to the LCD unit. For example, a PDP (Plasma Display Panel) unit, an OEL (Organic Electro-Luminescence) display unit, and the like may be used as the display unit.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A display apparatus comprising:
a display module having a flat display unit with a front surface, and a touchscreen panel provided on the display unit and extending to cover the front surface by protruding from the display unit, said display unit having a display screen on the front surface thereof and projecting pieces projecting parallel to the front surface from a side surface of the display unit at a position separated from the front surface towards a rear surface of the display unit;
a front cover part including an opening to receive the display unit, and a front surface to receive a protruding region of the touchscreen panel protruding from the display unit; and
a presser member inserted between the front surface of the front cover part and the projecting pieces in order to minimize floating or lifting of the display module from the front cover part.

2. The display apparatus as claimed in claim 1, wherein the front cover part includes a recess, formed in the front surface of the front cover part, to receive the protruding region of the touchscreen panel.

3. The display apparatus as claimed in claim 1, wherein the touchscreen panel is bonded on the front surface of the front cover part.

4. The display apparatus as claimed in claim 1, wherein the touchscreen panel is adhered on the front surface of the front cover part by a double-sided adhesive tape.

5. The display apparatus as claimed in claim 1, wherein the presser member is fixed on the front cover part.

6. The display apparatus as claimed in claim 5, wherein the presser member is fixed on the front cover part by screws.

7. The display apparatus as claimed in claim 1, further comprising:
a rear cover part covering a rear surface of the display unit.

8. An electronic equipment comprising:
a display apparatus comprising:
a display module having a flat display unit with a front surface, and a touchscreen panel provided on the display unit and extending to cover the front surface by protruding from the display unit, said display unit having a display screen on the front surface thereof and projecting pieces projecting parallel to the front surface from a side surface of the display unit at a position separated from the front surface towards a rear surface of the display unit;
a front cover part including an opening to receive the display unit, and a front surface to receive a protruding region of the touchscreen panel protruding from the display unit; and
a presser member inserted between the front surface of the front cover part and the projecting pieces in order to minimize floating or lifting of the display module from the front cover part; and
a main unit having a keyboard and a hinge, and accommodating a circuit board mounted with electronic parts having a computing function,
wherein the main unit is connected to the display apparatus via the hinge, and includes a closed state in which the display apparatus overlaps the keyboard with the front surface of the front cover part facing the keyboard, and an open state in which the front surface of the front cover part faces a front of the electronic equipment or faces obliquely upwards towards the front of the electronic equipment.

9. The electronic equipment as claimed in claim 8, wherein the front cover part of the display apparatus includes a recess, formed in the front surface of the front cover part, to receive the protruding region of the touchscreen panel.

10. The electronic equipment as claimed in claim 8, wherein the touchscreen panel of the display apparatus is bonded on the front surface of the front cover part.

11. The electronic equipment as claimed in claim 8, wherein the touchscreen panel of the display apparatus is adhered on the front surface of the front cover part by a double-sided adhesive tape.

12. The electronic equipment as claimed in claim 8, wherein the presser member of the display apparatus is fixed on the front cover part.

13. The electronic equipment as claimed in claim 12, wherein the presser member is fixed on the front cover part by screws.

14. The display apparatus as claimed in claim 8, wherein the display apparatus further comprises:
a rear cover part covering a rear surface of the display unit.

* * * * *